US012693214B2

(12) United States Patent
Taleyarkhan

(10) Patent No.: US 12,693,214 B2
(45) Date of Patent: Jul. 28, 2026

(54) HYBRID MASS-ALPHA SPECTROMETRY FOR HIGH RESOLUTION SPECTROSCOPY

(71) Applicant: Purdue Research Foundation, West Lafayette, IN (US)

(72) Inventor: Rusi P. Taleyarkhan, Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 735 days.

(21) Appl. No.: 18/099,325

(22) Filed: Jan. 20, 2023

(65) Prior Publication Data

US 2023/0236119 A1     Jul. 27, 2023

Related U.S. Application Data

(60) Provisional application No. 63/301,127, filed on Jan. 20, 2022.

(51) Int. Cl.
G01N 21/35 (2014.01)
G01N 1/40 (2006.01)

(52) U.S. Cl.
CPC .............. G01N 21/35 (2013.01); G01N 1/40 (2013.01)

(58) Field of Classification Search
CPC ........... G01N 21/35; G01N 1/40; G01V 5/281
See application file for complete search history.

(56) References Cited

U.S. PATENT DOCUMENTS

| | | | |
|---|---|---|---|
| 2009/0296871 A1* | 12/2009 | Taleyarkhan | G01T 3/00 376/153 |
| 2016/0025872 A1* | 1/2016 | Taleyarkhan | G01T 3/00 250/390.04 |
| 2018/0210098 A1* | 7/2018 | Taleyarkhan | G01T 5/06 |
| 2021/0239864 A1* | 8/2021 | Taleyarkhan | G01T 5/06 |

OTHER PUBLICATIONS

Krey, P.W. et al., Plutonium Isotopic Ratios at Rocket Flats, HASL-249, pp. 1-67 (1972).
Knoll, G., "Radiation detection and measurement," 3rd Ed. John Wiley & Sons, Inc., (2000); Abstract only.
Perrin, R.E. et al., Isotopic Analysis of Nanogram Quantities of Plutonium by Using a Sid Ionization Source, Intl. J. Mass Spectrometry and Ion Proc., 64 (1985) 17-24.

(Continued)

*Primary Examiner* — Uzma Alam
*Assistant Examiner* — Gisselle M Gutierrez
(74) *Attorney, Agent, or Firm* — Purdue Research Foundation

(57) ABSTRACT

The system includes a tensioned metastable fluid detector apparatus, a mixing chamber, and a processor. The processor is communicatively coupled to the tensioned metastable fluid detector apparatus. The processor executes steps to form an isotope detection rate versus negative pressure response curve and to determine the isotopic ratio. The mixing chamber is selectively coupled to the tensioned metastable fluid detector apparatus. The mixing chamber is configured to prepare a sample for tensioned metastable fluid detector analysis.

14 Claims, 15 Drawing Sheets

(56)        References Cited

OTHER PUBLICATIONS

Noshkin, V. et al., "Transuranics and other radionuclides in Bikini Laboon: Concentration data retrieved from aged coral sections," Limnology and Oceanography, Sep. 1975, vol. 20(5) (1975); available at https://doi.org/10.4319/lo.1975.20.5.0729.

Lamont, S. P. et al., "Determination of plutonium-240/239 ratios in low activity samples using high resolution alpha spectrometry," J. Radioanalytical and Nuclear Chemistry, vol. 234, Nos. 1-2, 195-199 (1998).

Hoover, A. W. et al., "Measurement of the 240Pu/239Pu mass ratio using a transition-edge-sensor microcalorimeter for total decay energy spectroscopy," Analytical Chemistry, 97(7), 3996-5000, (2015).

Taleyarkhan, R. P. et al., "Tensioned metastable fluid detectors and nanoscale interactions with external stimuli-theoretical-cum-experimental assessments and nuclear engineering applications," Nucl. Engr. Design, vol. 238 pp. 1820-1827 (2008).

Taleyarkhan, R. P. et al., "Real-time monitoring of actinides in chemical nuclear fuel reprocessing plants," Chemical Engr. Research and Design, vol. 91, pp. 688-702 (2013).

Hemesath, M., et al. "Actinide in air (Rn•progeny rejected alpha spectroscopy with tensioned metastable fluid detectors," Journal of Nuclear Engineering and Radiation Sciences, vol. 8, Apr. 2022, 022001-1; published online Oct. 19, 2021.

Taleyarkhan, R. P., "Monitoring neutron radiation in extreme gamma/x-ray radiation fields," Sensors 2020, vol. 20, 640; doi:10.3390/s20030640, 11 pages. www.mdpi.com/journal/sensors. (2020).

Taleyarkhan, R. P. et al., "Neutron spectroscopy and H*10 dosimetry with tensioned metastable fluid detectors," Nucl. Instr. & Meth. In Phys.Res., A vol. 959, No. 163278 (2020), p. 1-17.

Archambault, B. et al., "Large-array special nuclear material sensing with tensioned metastable fluid detectors," IEEE Sensors Journal, Special Issue, vol. 18, No. 19, (2018), pp. 7868-7874. http://dx.doi.org/10.1109/JSEN.2018.2845344.

Doto, P.C. et al., "Solvent Extraction Process for Recovery of Americium-241 at Hanford," Am. Chem. Soc. Symp. Series, 1980; vol. 161, Chap. 7, pp. 109-129.

Taleyarkhan, R. P. Taleyarkhan et al., "Metastable liquid cavitation control (with memory) apparatus, methodology and results: for radiation detection, reactor safety and other industrial applications," Journal of Nuclear Engineering and Radiation Science, vol. 3/011004-1 to 10, vol. 3, Jan. 2017.

* cited by examiner

Pu-239:240 Ratio---Selected Ratio 1: 0 239:240

Pu-239:240 Ratio---Selected Ratio 1: 0 239:240

Pu-239:240 Ratio---Selected Ratio 5:1 239:240

Pu-239:240 Ratio---Selected Ratio 1:1 239:240

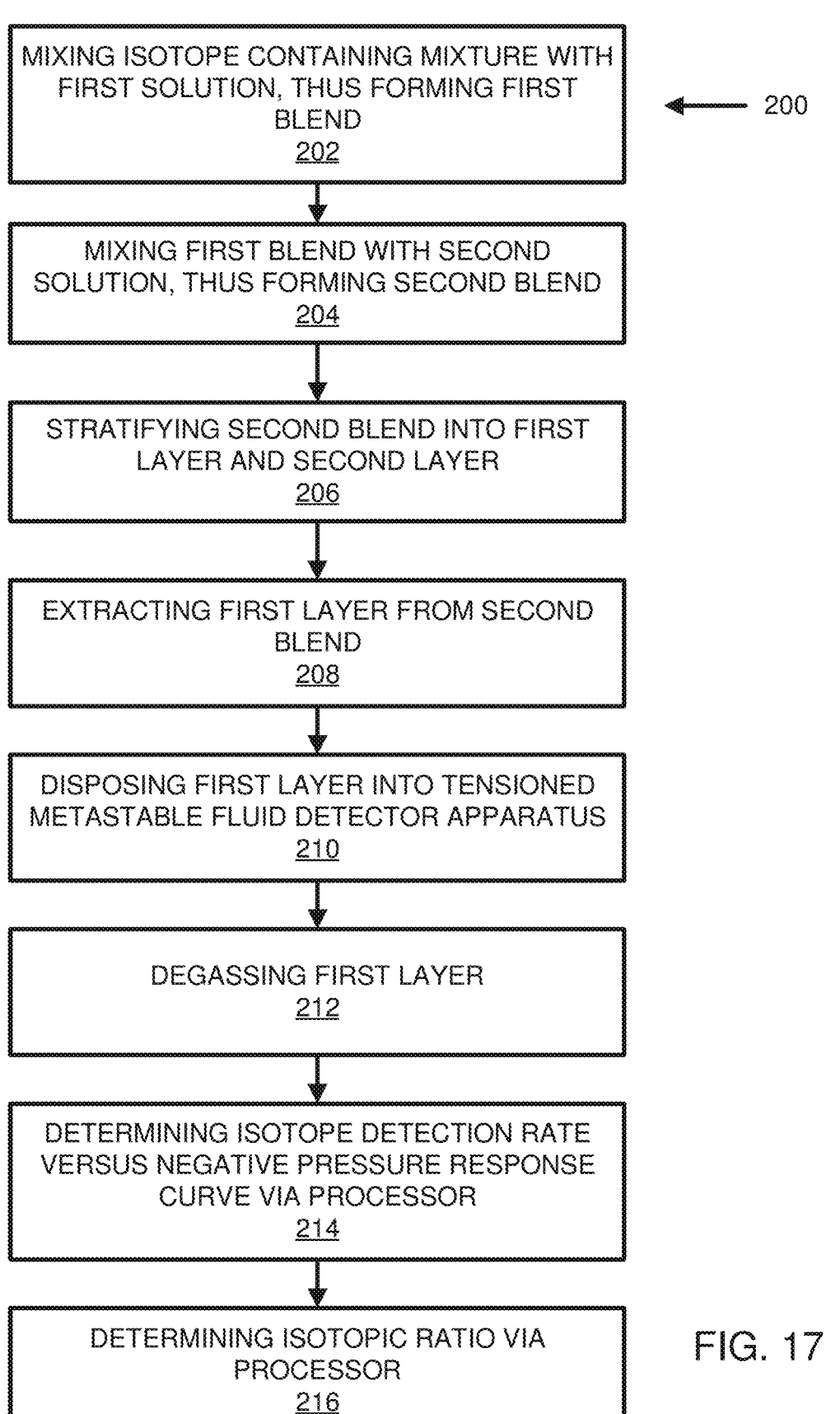

MIXING ISOTOPE CONTAINING MIXTURE WITH FIRST SOLUTION, THUS FORMING FIRST BLEND
202

← 200

MIXING FIRST BLEND WITH SECOND SOLUTION, THUS FORMING SECOND BLEND
204

STRATIFYING SECOND BLEND INTO FIRST LAYER AND SECOND LAYER
206

EXTRACTING FIRST LAYER FROM SECOND BLEND
208

DISPOSING FIRST LAYER INTO TENSIONED METASTABLE FLUID DETECTOR APPARATUS
210

DEGASSING FIRST LAYER
212

DETERMINING ISOTOPE DETECTION RATE VERSUS NEGATIVE PRESSURE RESPONSE CURVE VIA PROCESSOR
214

DETERMINING ISOTOPIC RATIO VIA PROCESSOR
216

FIG. 17

HYBRID MASS-ALPHA SPECTROMETRY FOR HIGH RESOLUTION SPECTROSCOPY

CROSS REFERENCE TO RELATED APPLICATIONS

The present application is a U.S. non-provisional application which claims the benefit of U.S. provisional application Ser. No. 63/301,127, filed Jan. 20, 2022, the content of which is incorporated by reference herein in its entirety.

GOVERNMENT SUPPORT CLAUSE

This invention was made with government support under DE-AC09-08SR22470 awarded by the Department of Energy. The government has certain rights in the invention.

FIELD

The disclosure generally relates to detection applications and, more particularly, to systems and methods for detecting radioactive particles.

INTRODUCTION

This section provides background information related to the present disclosure which is not necessarily prior art.

Alpha radiation monitoring is of significant importance in a multitude of arenas spanning nuclear medicine, radiation health physics, to nuclear energy, for combating nuclear terrorism and environmental sampling. A well-known challenge involves determination of the relative ratios of alpha emitting Pu-239 and Pu-240 isotopes in an unknown Pu isotope-bearing sample—which can then provide critical non-proliferation and treaty verification pertaining forensic evidence (i.e., reactor versus weapons-grade production). 1 The source of a Pu based special nuclear material (SNM) may be deduced from its Pu-239: Pu-240 ratio, which varies from ~10:1 (for weapons grade) to ~2:1 (for reactor grade); it should be noted that reactor grade Pu also includes Pu-238 alpha emissions which are well separated in energy from Pu-239/240 emissions and easily detected by CTMFDs as discussed subsequently. While numerous isotopes spontaneously decay to emit readily detectable gamma-beta radiation, only a relatively few (mainly actinides) emit alpha particles which are much more difficult to detect and characterize, mainly because of their relatively 1000×higher stopping power. Besides deciphering for alpha radiation itself, an even greater challenge presents itself for spectroscopic identification of alpha particles emitted in a combination of alpha decaying isotopes, even of the same element and/or isotope.

General alpha particle detection can be performed using semiconductor, scintillation, proportional counters as also with nuclear track detectors. For spectroscopically resolving alpha particle energies with ~30-100+keV type resolution, the passive implanted planar silicon (PIPS) spectroscopic semiconductor detection technology and liquid scintillation spectrometers (LSS) are commonly used approaches. However, in order to decipher alpha emission energies with ≤10 keV type resolution, mass spectroscopy (IC-MS/ICP-MS), or microcalorimetry-cryogenic techniques are used to detect and quantify coelutions of isotopic components. Several of such detection systems must also contend with natural background radiation effects (esp. from photon radiation), as also to consider environmental conditions of temperature, moisture (esp. condensing), shock, electromagnetic, dust and omnipresent electronic noise.

Not well known is that fluids, like solids, can be tensioned and placed under negative (sub-vacuum) pressures. When tensioned, the fluid becomes metastable and the bonds holding the molecules together can be weakened sufficiently so that external stimuli can break these bonds and create audible-visible-recordable cavitation detection events (CDEs) in the form of vapor bubbles that quickly (within microseconds) grow from a few nanometers to several millimeters in diameter. TMFDs exploit this behavior of fluids at negative pressures to monitor for high linear energy transfer (LET) ionizing radiation such as neutrons, alphas, and fission fragments to enable spectroscopic detection while remaining 100% blind to low LET ionizing radiation (e.g., gammas and betas) even under ~$10^4$ R h$^{-1}$ conditions.

TMFDs operate by tensioning the detector fluid, stretching the bonds holding the molecules together and placing the fluid in a state of metastability at subvacuum pressures. The tensioning of the fluid constantly pulls at the molecules, analogous to a rubber band being tensioned from both ends. The weakened molecular bonds can be broken when a nuclear particle interacts with the fluid, depositing enough energy to tear the fluid apart and induce a cavitation detection event (CDE) similar to how a tensioned rubber band snaps if a large enough puncture is made. TMFDs induce tensioned negative pressure states via one of two methods: acoustically or centrifugally (CTMFD).

The CTMFD induces $P_{neg}$ states by rotating the diamond-shaped container bearing the sensing fluid about its central axis, as shown in FIGS. 1A-1B. The $P_{neg}$ values can be estimated in general form using the well-known Bernoulli law for incompressible fluids (and neglecting body forces) using eqn (1) for any arbitrary radius (r) as:

$$P_{neg}(r) = 2 \times \pi^2 \times \rho \times f^2 \times \left(r_m^2 - r^2\right) - P_{amb} \qquad (1)$$

and, for representing the threshold tension state for sensitivity till the radial distance (rb) as, $$P_{neg,thresh} = 2 \times \pi^2 \times \rho \times f^2 \times \left(r_m^2 - r_b^2\right) - P_{amb} \qquad (2)$$

where, $P_{neg,thresh}$ is the "negative pressure" state at a radius $r_b$ from the centerline in the central bulb below which the liquid is sensitive, r is the density of the sensor fluid, f is the rotational frequency, $r_m$ is the average radial separation above the arms, and $P_{amb}$ is the ambient pressure. Note, that the negative pressure states quoted in this paper, e.g., $P_{neg}$=0.1 MPa or 1 bar, actually means that the fluid pressure is negative or sub-vacuum, i.e., −0.1 MPa (−1 bar). Upon reaching an appropriately high $P_{neg}$ state, the interaction with a particle of a high enough energy and linear energy transfer (LET) such as fast neutrons, fission fragments and alpha emission can lead to CDEs which manifest themselves as fast (within microseconds) growing bubbles that are audible, visible and electronically timed-recorded (e.g., via light-beam interrupt signals or acoustic waves), as illustrated in FIG. 2 (without the need for light-tight photomultiplier tubes, charge collection trains, pulse-shape discrimination, high voltage sources and associated electronic noise, vacuum chambers or quenching related challenges).

The inventors research on CTMFD based detection of alpha emitters, such as Pu-238, Am-241, etc., were conducted for single individual isotopes. These studies indicated that 100% gamma blind, high ($4\pi$) intrinsic efficiency (>95%) alpha decay detection may be possible with CTMFDs which have been directly validated using certified standards supplied by the United States National Institute of Standards and Technology (NIST). These attributes may permit detection at trace concentration levels—with 10-100× higher sensitivity than with known detection systems, such as a Beckman LS6500™ liquid scintillation spectrometer. For individual isotopes such as Pu-238 and Pu-239 with peak-to-peak separations of ~350 keV, the ratios for these isotopes in mixtures could be readily deciphered. Notably, the inventors could individually obtain separated (yet closely spaced) response curves for Pu-238 and Am-241 alpha emitters for which the recoil nuclei energies are only ~1.4 keV apart. The dominant alpha emission energies for Pu-238 and Am-241 are ~5.59 MeV and ~5.486 MeV, respectively (~10 keV separation between the dominant alpha energies and ~3 keV separation in the energy of the recoil nuclei). This situation is similar to the difference between the dominant alpha energy emission levels for Pu-239 and Pu-240—the current challenge is to be able to decipher for the ratio when these isotopes are in mixture form. The challenge of deciphering each of the two close alpha energy emitting isotopes Pu-239 and Pu-240 when in mixtures is discussed in the present disclosure.

Furthermore, each isotope of Pu-239 and Pu-240 both possess a dominant and secondary branch in various proportions (along with the associated Pneg thresholds—not including speed control error) as shown in Table 1 and also must be considered for relative impact on spectroscopic identification of emissions from Pu-239 vs. Pu-240.

TABLE 1

Alpha & recoil nucleus emission energies for Pu-239 and Pu-240

| Pu isotope | Branching ratio [%] | E alpha [MeV] | E recoil nucleus [keV] | $P_{neg}$ threshold (est.) (bar) |
|---|---|---|---|---|
| 239 | 70.8 | 5.156 | 87.772 | 4.15 |
| 239 | 17.1 | 5.144 | 87.562 | 4.25 |
| 239 | 11.9 | 5.105 | 86.902 | 4.3 |
| 240 | 72.8 | 5.168 | 87.596 | 4.35 |
| 240 | 27.2 | 5.123 | 86.842 | 4.4 |

Table 1 indicates that the alpha energies and the associated daughter recoil energies of Pu-239 and Pu-240 are almost identical, illustrating the difficulty for traditional alpha detectors (including PIPS based) to resolve these energies. Notable is the fact that despite the fact that the dominant E$\alpha$ (=5.156 MeV) for Pu-239 is lower than the corresponding E$\alpha$ (=5.168 MeV) for Pu-240, the recoil nucleus energy levels are reversed in magnitude and separated by ~0.2 keV—i.e., 87.772 keV for Pu-239 less 87.596 keV for Pu-240. Nucleation of bubbles leading to cavitation detection events (CDEs) in TMFDs are largely caused by higher LET ions (which deposit their energy over shorter ranges) even though the alpha particle will also contribute some of its energy while traversing past the critical radius for nucleation; therefore, paradoxically, the corresponding $P_{neg,thresh}$ for Pu-239 can be expected to be lower than that for Pu-240. One also must account for the contribution to detection rates from the associated (lower) energy alpha particle emissions from the same isotope. In order to account for such nuances, time consuming and costly mass-spectrometry services are required to be able to identify for the content of such alpha emitting isotopes and ascertaining isotopic ratios.

Accordingly, there is a continuing need for an efficient method that accurately separates Rn-progeny alpha emitting isotopes, while extracting actinides. Desirably, the method may enable enhanced Rn-progeny rejection while also efficiently detecting the extracted actinides that are transferred into an a-centrifugally tensioned metastable fluid detector (CTMFD). For instance, it would be valuable to rapidly (within hours) assess the CAM filter (that had alarmed) to ascertain if indeed the alarm was due to actinides.

SUMMARY

In concordance with the instant disclosure, a method that separates Rn-progeny alpha emitting isotopes, while extracting actinides, has been surprisingly discovered. Desirably, the method may enable enhanced Rn-progeny rejection while also efficiently detecting the extracted actinides that are transferred into an $\alpha$-CTMFD.

The system is configured to determine an isotopic ratio of an isotope bearing sample. The system includes a tensioned metastable fluid detector apparatus, a mixing chamber, and a processor. The processor may be communicatively coupled to the tensioned metastable fluid detector apparatus. The processor may execute steps to form an isotope detection rate versus negative pressure response curve and to determine the isotopic ratio. The mixing chamber may be selectively coupled to the tensioned metastable fluid detector apparatus. More specifically, the mixing chamber may be fluidly coupled with the tensioned metastable fluid detector apparatus. In a specific example, the mixing chamber may be configured to prepare a sample for tensioned metastable fluid detector analysis.

Various ways of using the system are provided. A method to determine an isotopic ratio of a mixture containing an isotope using the system is provided. The method may include a step of mixing the isotope containing mixture with a first solution. The first solution may include nitric acid. The mixture of the isotope containing mixture and the first solution may form a first blend. The first blend may then be mixed with a second solution. The second solution may include an extraction solvent. In a specific example, the extraction solvent may include tributyl phosphate. In a more specific example, the second solution may include tributyl phosphate and diisopropyl fluorophosphate. The mixture of the first blend with the second solution may form a second blend. The second blend may be stratified into a first layer and a second layer. The first layer may then be extracted from the second blend. In a specific example, the first layer may include the tributyl phosphate and the isotope. The first layer may be disposed into a tensioned metastable fluid detector apparatus. An isotope detection rate versus negative pressure response curve may be determined via a processor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 16:
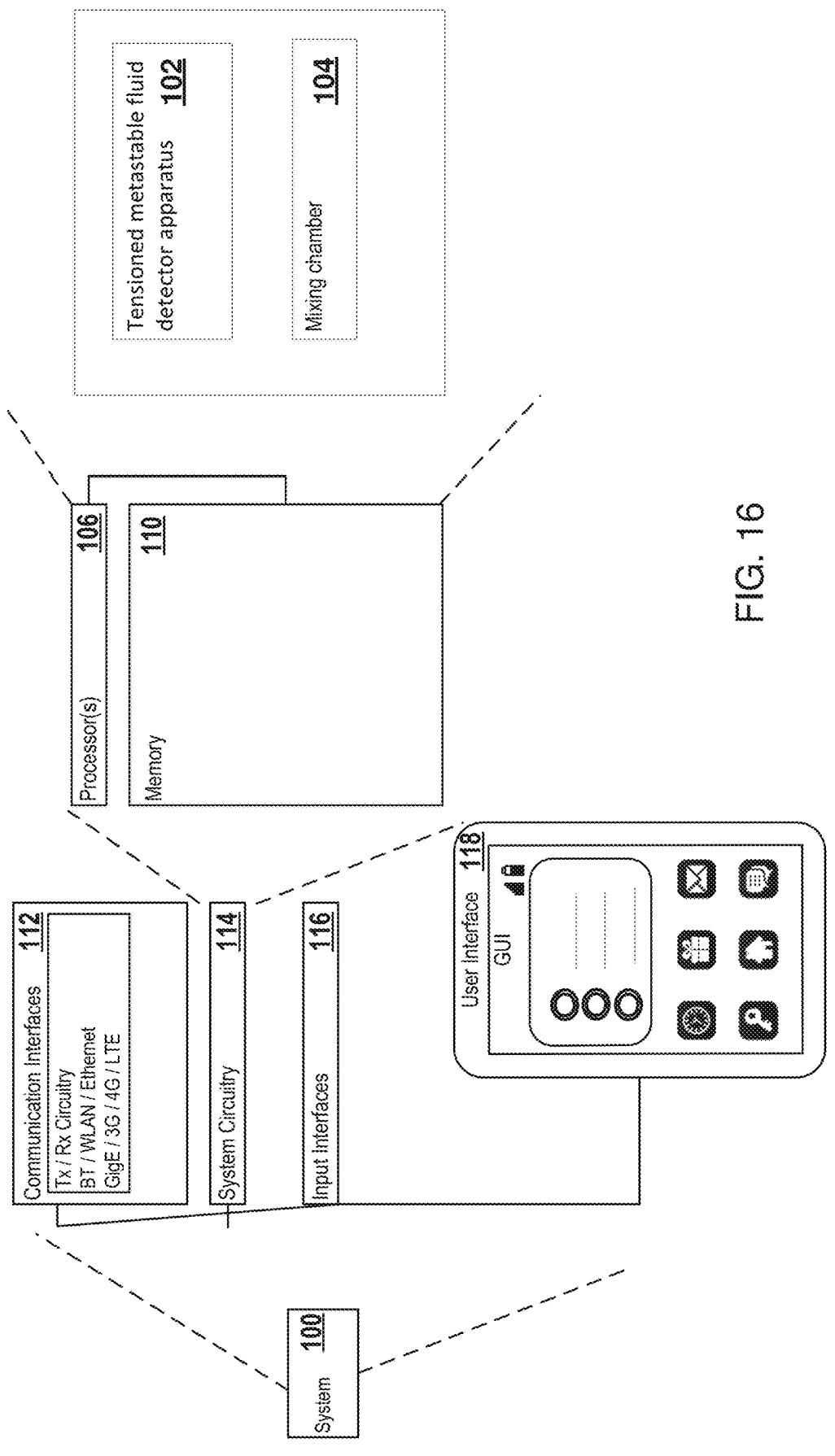

FIG. 16 is a schematic diagram of another example of the system, further depicting the system having a communication interface, an input interface, a user interface, and a system circuitry, wherein the system circuitry may include a processor and a memory, according to one embodiment of the present disclosure; and FIG. 17 is a flow chart of a method for using the system to determine an isotopic ratio of an isotope bearing sample, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 1A, 1B:
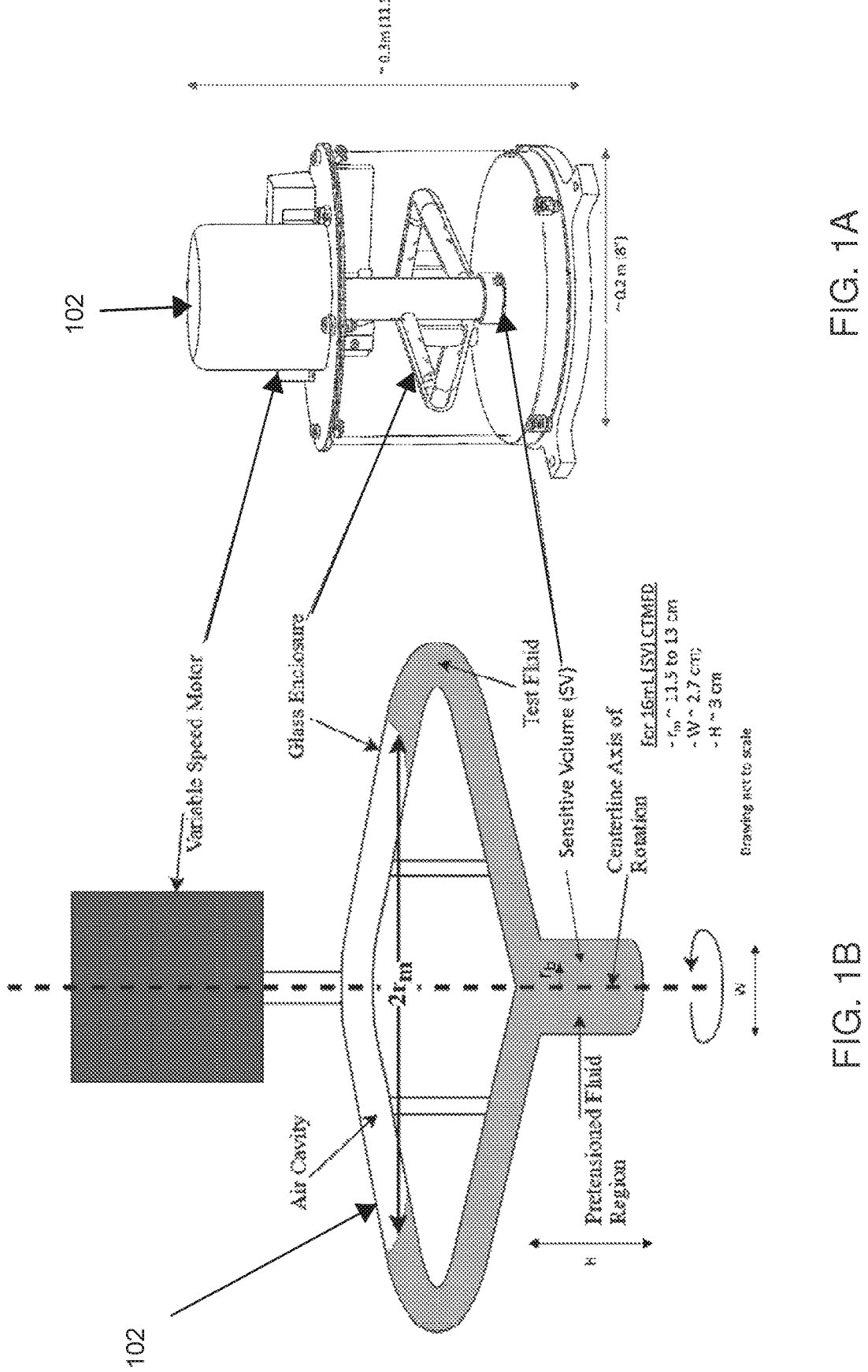
FIG. 1A is a front perspective view of a centrifugally tensioned metastable fluid detector (CTMFD) apparatus.
FIG. 1B is an enlarged front elevational view of the CTMFD apparatus, as shown in FIG. 1A, further depicting a center line which indicates an axis of rotation, according to one embodiment of the present disclosure.
Figure 15:
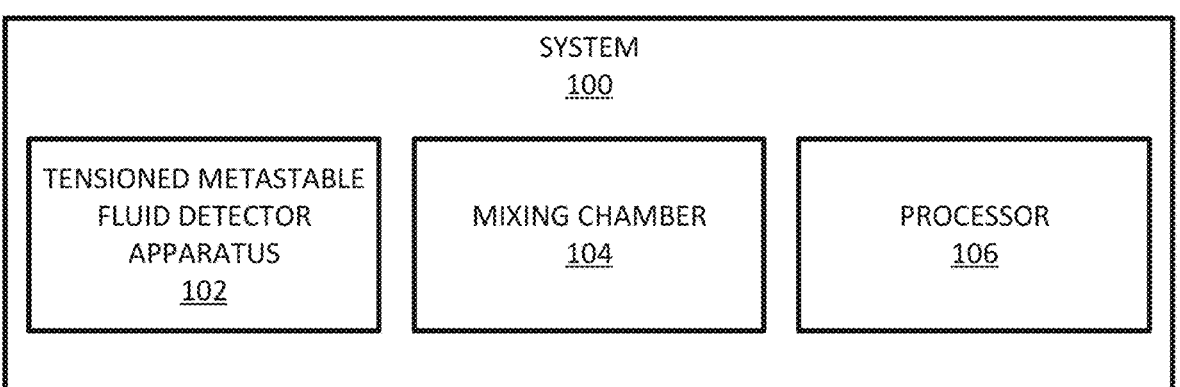
FIG. 15 is a box diagram illustrating the system, further depicting the system having a tensioned metastable fluid detector apparatus, a mixing chamber, and a processor, according to one embodiment of the present disclosure.

Unless otherwise defined in the detailed description, the following acronyms may be understood as:

CDE Cavitation detection event
CTMFD Centrifugally tensioned metastable fluid detector
DFP Decafluoropentane ($C_5H_4F_{10}$)
E Energy
f Rotation frequency
Radius ($r_m$—meniscus separation distance; $r_b$=distance of sensitive zone from centerline)
LET Linear energy transfer
LSS Liquid scintillation spectrometry
MS Mass spectrometry
NIST National Institute of Standards and Technology (USA)
PIPS Passive implanted planar silicon
$P_{neg}$ Negative (tensioned state) pressure
SV Sensitive volume
$V_b$ Volume of central detection bulb of CTMFD correspond to radius r=$r_b$ (eqn (4))
$\alpha$ Alpha radiation particle
$\rho$ Fluid density The system is configured to determine an isotopic ratio of an isotope bearing sample. As shown in FIGS. 1A, 1B, and 15; the system 100 includes a tensioned metastable fluid detector apparatus 102, a mixing chamber 104, and a processor 106. The processor 106 may be communicatively coupled to the tensioned metastable fluid detector apparatus 102. The processor 106 may execute steps to form an isotope detection rate versus negative pressure response curve and to determine the isotopic ratio. The mixing chamber 104 may be selectively coupled to the tensioned metastable fluid detector apparatus 102. More specifically, the mixing chamber 104 may be fluidly coupled with the tensioned metastable fluid detector apparatus 102. In a specific example, the mixing chamber 104 may be configured to prepare a sample for tensioned metastable fluid detector analysis.

The formation of the isotope detection rate versus negative pressure response curve may include various identifications. For instance, the formation of the isotope detection rate versus negative pressure response curve may include identifying a negative pressure of a center line in the tensioned metastable fluid detector apparatus 102. The processor 106 may utilize a third algorithm to identify a negative pressure of a center line in the tensioned metastable fluid detector apparatus 102. It should be appreciated that the numbering of the algorithms may be rearranged or altered, within the scope of the present disclosure. The third algorithm may include:

$$P_{neg,CL} = 2 \times \pi^2 \times \rho \times f^2 \times \left(r_m^2\right) - P_{amb} \qquad (3)$$

The formation of the isotope detection rate versus negative pressure response curve may further include identifying a radius of a portion of fluid that is above a threshold negative pressure state. The processor 106 may utilize a fourth algorithm to identify a radius of a portion of fluid that is above a threshold negative pressure state. The fourth algorithm may include:

$$r_b = r_m \times \left(1 - \frac{P_{neg,thresh} + P_{amb}}{P_{neg,CL} + P_{amb}}\right)^{0.5} \qquad (4)$$

Even further, the formation of the isotope detection rate versus negative pressure response curve may include identifying a predicted count rate at a negative pressure state. One skilled in the art may select other ways to form the isotope detection rate versus negative pressure response curve, within the scope of the present disclosure. The processor 106 may utilize a fifth algorithm to identify a predicted count rate at a negative pressure state. The fifth algorithm may include:

$$C_{pred} = C_{fs} \times V_b \qquad (5)$$

The determination of the isotopic ratio may include various determinations. For instance, the determination of the isotopic ratio may include determining a difference between a measured count rate and an expected count rate for each isotopic ratio at a measured negative pressure. The processor 106 may utilize a sixth algorithm to determine a difference between a measured count rate and an expected count rate for each isotopic ratio at a measured negative pressure. The sixth algorithm may include:

$$Dif_{i_r} = \left| \frac{CPM_{m_{i_r}}}{AVG\left(CPM_{m_{i_r}}\right)} - \frac{CPM_{p240_{i_r}}}{AVG\left(CPM_{p240_{i_r}}\right)} \times \frac{X}{(X+Y)} - \frac{CPM_{p239_{i_r}}}{AVG\left(CPM_{p239_{i_r}}\right)} \times \frac{Y}{(X+Y)} \right| \qquad (6)$$

The determination of the isotopic ratio may also include determining a measurement error. The processor 106 may utilize an eighth algorithm to determine a measurement error. The eighth algorithm may include:

$$E_{Dif_{i_r}} =$$

$$\sqrt{ \begin{array}{l} \left[ \left( \frac{\delta Dif_{i_r}}{\delta CPM_{m_{i_r}}} \right)^2 \times \left( E_{CPM_{m_{i_r}}} \right)^2 + \left( \frac{\delta Dif_{i_r}}{\delta CPM_{p240_{i_r}}} \right)^2 \times \left( E_{CPM_{p240_i}} \right)^2 + \right. \\ \left( \frac{\delta Dif_{i_r}}{\delta CPM_{p239_{i_r}}} \right)^2 \times \left( E_{CPM_{p239_i}} \right)^2 + \left( \frac{\delta Dif_{i_r}}{\delta AVG\left(CPM_{m_i}\right)} \right)^2 \times \left( E_{AVG\left(CPM_{m_i}\right)} \right)^2 + \\ \left. \left( \frac{\delta Dif_{i_r}}{\delta AVG\left(CPM_{p240_i}\right)} \right)^2 \times \left( E_{AVG\left(CPM_{p240_i}\right)} \right)^2 + \left( \frac{\delta Dif_{i_r}}{\delta AVG\left(CPM_{p239_i}\right)} \right)^2 \times \left( E_{AVG\left(CPM_{p239_i}\right)} \right)^2 \end{array} }$$

The determination of the isotopic ratio may also include determining a percentage of confidence between the isotopic ratio and the measurement of error. The processor 106 may utilize a tenth algorithm to determine a measurement error. The tenth algorithm may include:

$$P_r = \frac{C_r}{C_{sum}} \qquad (10)$$

The tensioned metastable fluid detector apparatus 102 may be provided with various configurations and materials. For instance, the tensioned metastable fluid detector apparatus 102 may be a centrifugally tensioned metastable fluid detector apparatus. In another specific example, the tensioned metastable fluid detector apparatus 102 may be molded or otherwise manufactured with a plastic material. By using a molded plastic apparatus, the construction and operation of the tensioned metastable fluid detector apparatus 102 may be improved compared to the use of a glass blower (based) apparatus which, despite best efforts of the glass blower, cannot make the parts with the same precision and involves imbalances during the spinning operation.

Figure 2:
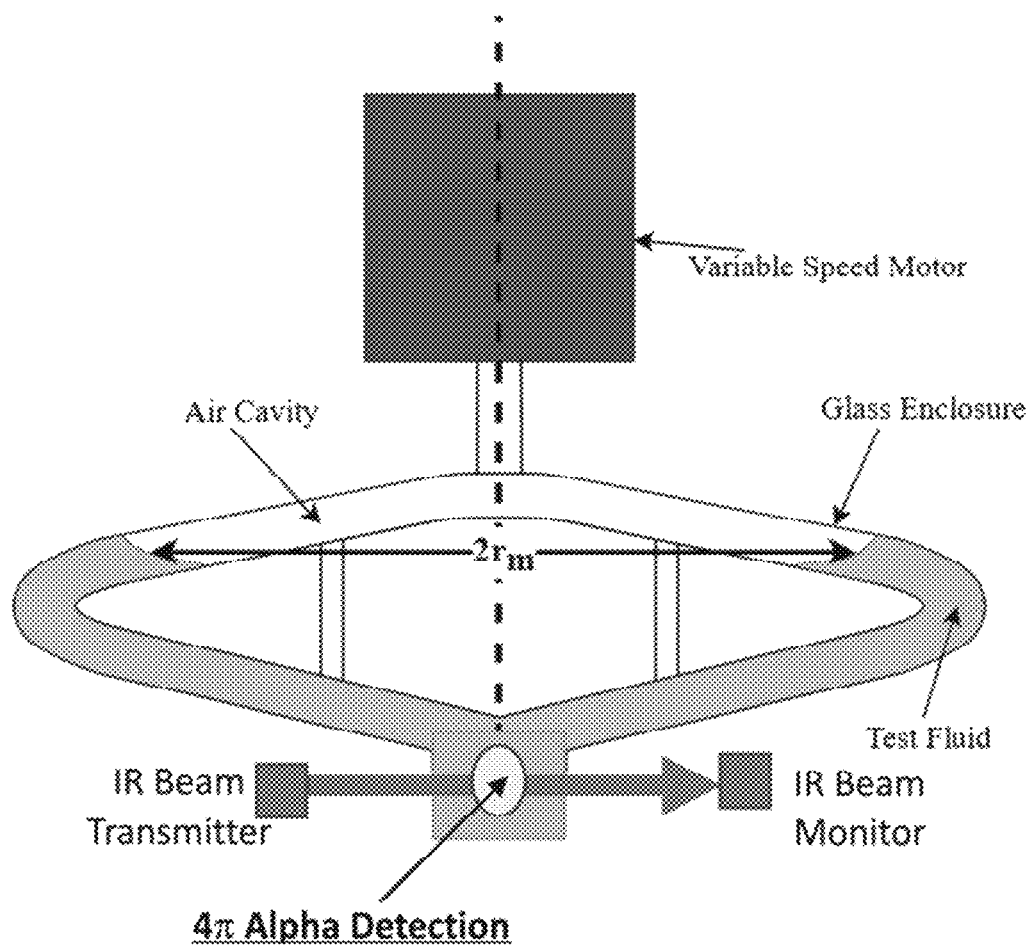
FIG. 2 is a front elevational view of a CTMFD apparatus, further depicting an infrared beam transmitter and infrared beam monitor for 4π alpha detection, according to one embodiment of the present disclosure.

Imbalances may lead to vibration which can affect the sensitivity calibration. The plastic material may not chemically react with a centrifugally tensioned metastable fluid detector sensing fluid. Non-limiting examples of the sensing fluid may include acetone and/or diisopropyl fluorophosphate. The plastic material may have a strength to withstand fluid pressures through +/−10 bar (+/−150 psi). The plastic material may also be configured to militate against air to diffuse from the outside atmosphere into the system, which may lead to spurious detection events. Provided as a non-limiting example, the plastic material may include PETG: Easter 6763. In a more specific, non-limiting example, the plastic material may have a thickness greater than around one and a half millimeters. In another specific example, as shown in FIG. 2, the centrifugally tensioned metastable fluid detector apparatus 102 may include a main housing that is substantially diamond-shaped. The main housing may have a first portion P1 and a second portion P2. The first portion P1 may be coupled to the second portion P2 by an adhesive, a thermal means, and/or an acoustic means. A skilled artisan may select other suitable ways to provide the tensioned metastable fluid detector apparatus 102, within the scope of the present disclosure.

The system may have various capabilities and applications. For instance, the system may have an alpha energy resolution under 10 keV. The system may have a $4\pi$ alpha detection efficiency greater than about ninety-five percent. The system may be utilized with a nuclear forensic detector, for nuclear medicine devices, radiation health physics, environmental sampling, and for combatting nuclear terrorism.

Various ways of using the system 100 are provided. As shown in FIG. 17, a method 200 to determine an isotopic ratio of a mixture containing an isotope using the system is provided. The method 200 may include a step 202 of mixing the isotope containing mixture with a first solution in the mixing chamber 104. The first solution may include nitric acid. The mixture of the isotope containing mixture and the first solution may form a first blend. The first blend may then be mixed with a second solution in the mixing chamber 104. The second solution may include an extraction solvent. In a specific example, the extraction solvent may include tributyl phosphate. In a more specific example, the second solution may include tributyl phosphate and diisopropyl fluorophosphate. The mixture of the first blend with the second solution may form a second blend. The second blend may be stratified into a first layer and a second layer in the mixing chamber 104. The first layer may then be extracted from the second blend. In a specific example, the first layer may include the tributyl phosphate and the isotope. The first layer may be disposed into a tensioned metastable fluid detector apparatus 102. An isotope detection rate versus negative pressure response curve may be determined via a processor 106. A skilled artisan may select other suitable methods for using the system 100, within the scope of the present disclosure.

In certain circumstances, the method 200 may further include a step 212 of degassing the first layer after the step of disposing the first layer into the tensioned metastable fluid detector apparatus 102, but before the step 214 of determining the isotope detection rate versus negative pressure response curve. More specifically, the first layer may be degassed via an americium-beryllium isotope neutron source. It should be appreciated the order of the steps of the method 200 may be rearranged as desired, within the scope of the present disclosure.

FIG. 16 illustrates a second example of the system 100. The system 100 may include communication interfaces 112, input interfaces 116 and/or system circuitry 114. The system circuitry 114 may include a processor 106 or multiple processors. The processor 106 or multiple processors execute the steps to determine a response curve based on an isotope detection rate compared to a negative pressure, output the isotopic ratio, and output an associated uncertainty of the isotopic ratio. In a specific example, the processor 106 may calculate a negative pressure state negative pressure of a center line in the tensioned metastable fluid detector apparatus 102 and/or identify a radius of a portion of fluid that is above a threshold negative pressure state. Alternatively, or in addition, the system circuitry 114 may include memory 110.

The processor 106 may be in communication with the memory 110. In some examples, the processor 106 may also be in communication with additional elements, such as the communication interfaces 112, the input interfaces 116, and/or the user interface 118. Examples of the processor 106 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 106 may be one or more devices operable to execute logic. The logic may include computer executable instructions or computer code stored in the memory 110 or in other memory that when executed by the processor 106, cause the processor 106 to perform the operations of tensioned metastable fluid detector apparatus 102, the mixing chamber 104, and/or the system 100. The computer code may include instructions executable with the processor 106.

The memory 110 may be any device for storing and retrieving data or any combination thereof. The memory 110 may include non-volatile and/or volatile memory, such as a random access memory (RAM), a read-only memory (ROM), an erasable programmable read-only memory (EPROM), or flash memory. Alternatively or in addition, the memory 110 may include an optical, magnetic (hard-drive), solid-state drive or any other form of data storage device. The memory 110 may be included in any component or sub-component of the system 100 described herein.

The user interface 118 may include any interface for displaying graphical information. The system circuitry 114 and/or the communications interface(s) 112 may communicate signals or commands to the user interface 118 that cause the user interface to display graphical information. Alternatively or in addition, the user interface 118 may be remote to the system 100 and the system circuitry 114 and/or communication interface(s) may communicate instructions, such as HTML, to the user interface to cause the user interface to display, compile, and/or render information content. In some examples, the content displayed by the user interface 118 may be interactive or responsive to user input. For example, the user interface 118 may communicate signals, messages, and/or information back to the communications interface 112 or system circuitry 114.

The system 100 may be implemented in many different ways. In some examples, the system 100 may be implemented with one or more logical components. For example, the logical components of the system 100 may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 110, for example, that comprises instructions executable with the processor 106 or other processor to implement one or more of the features of the logical components. When any one of the logical components includes the portion of the memory that comprises instructions executable with the processor 106, the component may or may not include the processor 106. In some examples, each logical component may just be the portion of the memory 110 or other physical memory that comprises instructions executable with the processor 106, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. More-over, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor 106 or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor 106 may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

Regarding more specific capabilities of the processor 106, the following is provided. Eqn (1) in the "Introduction" described how to evaluate for the negative pressure state at any point $r_b$ in the radial direction from the centerline of the bulb region. Consequently, for a given value of $r_b$ and $r_m$, the $P_{neg}$ state is only a function of the rotational frequency, which can readily be tailored, providing the CTMFD with selective sensitivity and energy discrimination capabilities. Notably, for alpha spectroscopy, the CTMFD remains completely insensitive to the radiation energy imparted to the atoms in the sensing fluid until the threshold negative pressure state "$P_{neg,thresh}$" is first reached (which first occurs for $r_b$=0) at the centerline in the bulb and then progresses outwards. This negative pressure state is determined to be the onset of sensitivity for detecting the alpha decay event for that isotope. As the frequency of rotation increases, the radius ($r_b$) at which the fluid reaches the required $P_{neg}$,thresh state for detecting the specific alpha decay events also expands, as more and more of the central bulb becomes sensitive as evidenced from eqn (2). For this work, a $P_{neg}$ sweep was performed to determine the average count rate at each negative pressure state from onset of sensitivity to full sensitivity for each isotope of plutonium.

EXAMPLE

Figure 3:
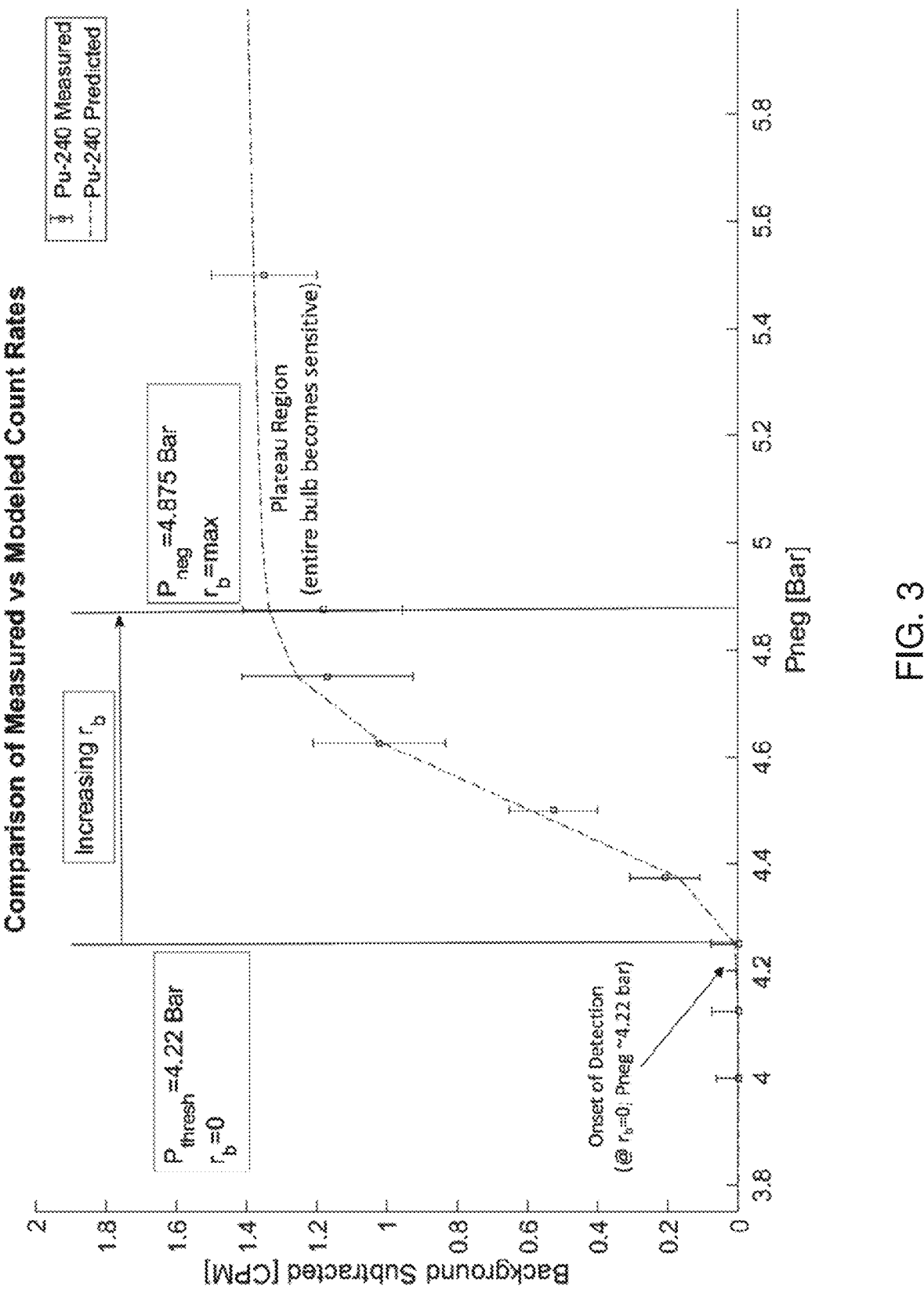
FIG. 3 is a line graph illustrating a variation of measured count rate compared to a negative pressure for an isotope, such as Pu-240, using a 15 cc CTMFD apparatus, according to one embodiment of the present disclosure.

As shown in FIG. 3, a non-limiting example of a $P_{neg}$ sweep as measured in a ~15-16 mL (central bulb) sensitive volume (SV) CTMFD containing Pu-240 dissolved in the sensor fluid at a concentration of ~0.001 Bq cc$^{-1}$ giving rise to a count rate of ~1.3 cpm when the entire SV has reached the required $P_{neg}$ (~4.3 bar@onset) threshold for detecting alpha emissions from Pu-240 decay. It should be appreciated that $P_{neg}/P_{thresh}$ values are quoted in "bar" units (1 bar=0.1 MPa). Note also, that unless otherwise stated, the quoted values of $P_{neg}$ represent the fluid tensioned pressure state along the centerline (i.e., r=0).

With continued reference to FIG. 3, it is seen that as $P_{neg}$ ($r_b$=0) increases starting with sensitivity to the primary Ex, the count rate increases as the detection volume increases (including with the contribution to detection from the secondary alpha emissions) until a full bulb sensitivity is reached when $P_{neg}$ (@$r_b$~25 mm) reaches $P_{neg,thresh}$. At this stage, when $P_{neg}$ (@$r_b$=0) is ~4.8 bar, the CDEs from primary and secondary alpha emissions are all contributive. One can estimate for the required rotational frequency to reach the experimentally derived value for $P_{neg,thresh}$ for any given alpha emitting nuclide by setting $r_b$=0 in eqn (2) to obtain the corresponding $P_{neg}$ state in the centerline (CL):

$$P_{neg,CL} = 2 \times \pi^2 \times \rho \times f^2 \times \left(r_m^2\right) - P_{amb} \tag{3}$$

where, $P_{thresh}$ is the experimentally determined threshold "negative" pressure for each actinide. Using eqn (2) and (3) together, the radius ($r_b$) for portion of fluid in the radial direction that is above the required $P_{neg}$,thresh value can be derived as, $$r_b = r_m \times \left(1 - \frac{P_{neg,thresh} + P_{amb}}{P_{neg,CL} + P_{amb}}\right)^{0.5} \tag{4}$$

Clearly, when $P_{neg,thresh}$=$P_{neg,CL}$, then $r_b$=0. As the rotation frequency "f" increases, $P_{neg,CL}$ increases and so does "$r_b$". This sensitive radius ($r_b$) is then used to determine the effective sensitive volume ($V_b$) at any $P_{neg}$ state above the threshold as "f" increases. Since both Pu-239 and Pu-240 both exhibit fractional ($r_i$) branch emissions (as listed in Table 1) of alpha particles of different energies, $V_b$ is calculated as the fraction weighted sum of sub-volumes ($V_{b,i}$) for each of the "i" branch emissions, each with its own $r_{b,i}$. To illustrate, for a right circular cylinder of radius "r=$r_{b,i}$" and height "H", $V_{b,i}$=$\pi \times r_{b,i}^2 \times H$. However, the actual shape of the as-manufactured CTMFD's central bulb comprises for most part, a right circular cylinder with a conical top like shape connected at the end to the two arms (as schematically shown in FIGS. 1A-1B). These geometrical aspect refinements are taken into account by breaking the CTMFD's central sensitive volume into several geometric shapes-correcting also for the error in motor speed (f) via normal cumulative distribution function value (calculated in the MATLA® script) wherein the standard deviation equals to the full error (est. ~4%) for $P_{neg}$ in the motor control.

Once this is done, the predicted count rate ($C_{pred}$) at each $P_{neg}$ state is then determined by multiplying the experimentally measured full sensitivity count rate ($C_{fs}$), by the aforementioned predicted sensitive volume ($V_b$) which includes contributions to detection from multiple (branching ratio based) alpha emitters (discussed further in Section 2.1), which collectively become progressively involved based on energy for each isotope in the mixture. That is:

$$C_{pred} = C_{fs} \times V_b \tag{5}$$

Where, the full sensitivity activity ($C_{fs}$) is determined by averaging the measured CTMFD count rate at/beyond start of the count rate plateau region starting at $P_{neg}$ ($r_b$=0) when $P_{neg}$ (@$r_b$=max. SV bulb radius) the entire central CTMFD bulb volume is now sensitive. FIG. 3 shows an example of the predicted versus actually measured count rates in a CTMFD bearing Pu-240 only, wherein, the plateau starts at $P_{neg}$ ~4.83 bar.

The above model assumes isotopic homogeneity and neglects 3-D effects. For example, it assumes no variation of $P_{neg}$ from top to bottom of the sensitive fluid in the central bulb, as well as assumes absence of significant fluid-structure interaction effects at wall-fluid interfaces esp. when the fluid next to the arms starts to reach $P_{thresh}$. Future refinements need to take these aspects into account. As a consequence, some distortion between the predicted and measured detection rates at various $P_{neg}$ states is to be expected. However, from a practical sense, what is important is to see if the current theoretical framework, and deconvolution algorithm when used with the CTMFD sensor apparatus can accurately assay for the mass/activity fractions of Pu-239 and Pu-240 within the CTMFD fluid mixture.

Figure 4:
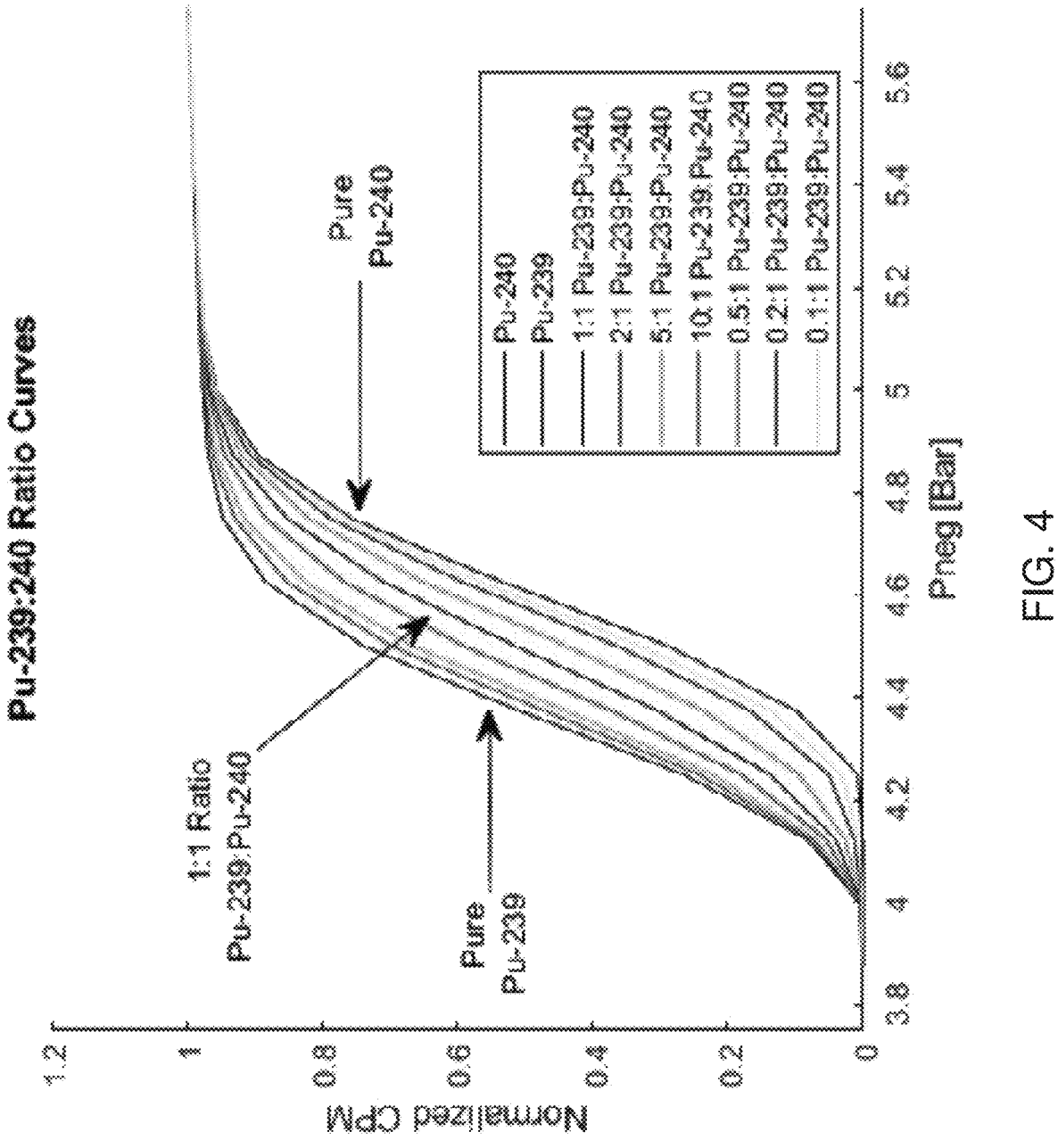
FIG. 4 is a ratio curve illustrating a comparison between count rate and negative pressure for various Pu-239: Pu-240 activity ratio mixtures, according to one embodiment of the present disclosure.

Using the modeling scheme for predicting detection rate vs. $P_{neg}$ response curves for individual isotopes, as described previously, an algorithm was devised to deconvolute a response curve resulting from an unknown mixture of Pu-239/240 isotopes. A set of normalized count rate vs. $P_{neg}$ response curves was created for Pu-239:240 mixtures by multiplying the expected (predicted) count rates by the activity ratios of each mixture ranging from 1:0 to 0:1. This is based on the assumption that the two isotopes remain uniformly mixed and the alpha emissions all contribute to causing CDEs without being interrupted (i.e., negligible spatial separation and wall effects). FIG. 4 shows an example of the family of response curves based on experimentally derived $P_{thresh}$ for Pu-239 and Pu-240-which include speed control effects. As noted therein, while the dominant alpha energies are well within ~10 keV of each other, and the associated recoil nuclei energies are within ~0.8 keV of each other, the corresponding $P_{thresh}$ values are yet separated by ~0.25 bar, ranging from ~4 bar (for Pu-239) and ~4.25 bar (for Pu-240), respectively. The $P_{neg}$ values are deemed to be accurate to within ~1-2% (1 SD) error based on the error in rotation frequency (or ~0.03 to ~0.07 bar). Therefore, the prediction algorithm must also take overall uncertainties into account as well as for subtracting CDEs that may be caused from background radiation (esp., from fast neutrons). It is to be noted that due to the very closely spaced alpha and recoil emissions (as shown in Table 1), the response curves derived from the mathematical model, as shown in FIG. 4, even though separated, also involve considerable overlap over the $P_{neg}$ range of 4.1 bar to 4.9 bar. The dominant Pu-240 recoil energy of 87.596 keV is greater than two of the three alpha recoil energies from Pu-239 emissions. In addition, to arrive at full SV sensitivity even for Pu-239 emissions, the $P_{neg}$ values range through ~4.8 bar. Such closeness and overlaps present a challenge. As such, a suitable algorithm was deemed necessary—one that trains on the mathematical model-based response curves of FIG. 4, and then deciphers the experimentally obtained response curve data and uncertainties involved, for an arbitrary mixture of Pu-239 and Pu-240; subsequently, to then provide a best-estimate prediction (and uncertainty) for the highest likelihood combination of the two isotopes from a range of possibilities.

An algorithm was then developed to determine a figure of merit to optimally decipher the highest likelihood of each isotopic activity ratio considered between the two isotopes using the following steps: Note, subscript i indicates a singular $P_{neg}$ state and subscript r indicates a specific ratio of the two isotopic components within the mixture.

(1) The algorithm calculates the difference between the measured count rate and expected (1-D model predicted) count rate for each isotopic ratio (r) at each negative pressure measured.

$$Dif_{i_r} = \left| \frac{CPM_{m_{i_r}}}{AVG\left(CPM_{m_{i_r}}\right)} - \frac{CPM_{p240_{i_r}}}{AVG\left(CPM_{p240_{i_r}}\right)} \times \frac{X}{(X+Y)} - \frac{CPM_{p239_{i_r}}}{AVG\left(CPM_{p239_{i_r}}\right)} \times \frac{Y}{(X+Y)} \right| \quad (6)$$

Where, at any $P_{neg}$ (i) state for i=1, . . . n, $Dif_{i_r}$, is the calculated difference between the measured count rate, $CPM_{mir}$; and model predicted count rate, $CPM_{pir}$; for each actinide with X proportion of Pu-240, and Y proportion of Pu-239 e.g. X=1, Y=1, for 1:1 ratio. Note the normalization factor in the denominator of each term is the average of the count rate at the plateau once the entire bulb is sensitive, as described previously.

(2) The average difference for each ratio from eqn (6) is then calculated by averaging the differences calculated in Step 1 over all $P_{neg}$ (i) states.

$$Dif_{avg_r} = \frac{\sum_{i=1}^{n} Dif_{i_r}}{n} \quad (7)$$

Where, $Dif_{avg_r}$ is the average difference for each ratio r, and n is the total number of Pneg states measured.

(3) The measurement error is propagated and similarly averaged as in Step 2 to determine the average error for each ratio as shown below in eqn (8).

$$E_{Dif_{i_r}} = \quad (8)$$

$$\sqrt{\begin{aligned}&\left(\frac{\delta Dif_{i_r}}{\delta CPM_{m_{i_r}}}\right)^2 \times \left(E_{CPM_{m_{i_r}}}\right)^2 + \left(\frac{\delta Dif_{i_r}}{\delta CPM_{p240_i}}\right)^2 \times \left(E_{CPM_{p240_i}}\right)^2 + \\ &\left(\frac{\delta Dif_{i_r}}{\delta CPM_{p239_{i_r}}}\right)^2 \times \left(E_{CPM_{p239_i}}\right)^2 + \left(\frac{\delta Dif_{i_r}}{\delta AVG\left(CPM_{m_i}\right)}\right)^2 \times \left(E_{AVG\left(CPM_{m_i}\right)}\right)^2 + \\ &\left(\frac{\delta Dif_{i_r}}{\delta AVG\left(CPM_{p240_i}\right)}\right)^2 \times \left(E_{AVG\left(CPM_{p240_i}\right)}\right)^2 + \left(\frac{\delta Dif_{i_r}}{\delta AVG\left(CPM_{p239_i}\right)}\right)^2 \times \left(E_{AVG\left(CPM_{p239_i}\right)}\right)^2\end{aligned}}$$

$$\frac{\delta Dif_{i_r}}{\delta CPM_{m_i}} = \frac{1}{AVG\left(CPM_{m_i}\right)}$$

-continued $$\frac{\delta Dif_{i_r}}{\delta CPM_{p240_i}} = \frac{-X}{X+Y} \times \frac{1}{AVG\left(CPM_{p240_i}\right)}$$

$$\frac{\delta Dif_{i_r}}{\delta CPM_{p239_i}} = \frac{-Y}{X+Y} \times \frac{1}{AVG\left(CPM_{p239_i}\right)}$$

$$\frac{\delta Dif_{i_r}}{\delta AVG\left(CPM_{m_i}\right)} = \frac{-CPM_{m_{i_r}}}{AVG\left(CPM_{m_{i_r}}\right)^2}$$

$$\frac{\delta Dif_{i_r}}{\delta AVG\left(CPM_{p240_i}\right)} = \frac{X}{X+Y} \times \frac{CPM_{p240_{i_r}}}{AVG\left(CPM_{p240_{i_r}}\right)^2}$$

$$\frac{\delta Dif_{i_r}}{\delta AVG\left(CPM_{p239_i}\right)} = \frac{Y}{X+Y} \times \frac{CPM_{p239_{i_r}}}{AVG\left(CPM_{p239_{i_r}}\right)^2}$$

$$E_{Dif_{avg_r}} = \frac{\sum_{i=1}^{n} E_{Dif_{i_r}}}{n}$$

(4) The standard deviation of the differences for each ratio is then calculated.

$$\sigma_r = \sqrt{\sum_{i=1}^{n} \frac{\left(Dif_{i_r} - Dif_{avg_r}\right)^2}{n}} \quad (9)$$

(5) The average error and standard deviation are then summed and divided by the product of the average error and average differences for each ratio. This value is then summed.

$$E_{T_r} = \sigma_r + E_{Dif_{avg_r}}, \; E_{sum} = \sum_{r=1}^{9} E_{T_r}$$

$$C_r = \frac{E_{sum}}{E_{T_r} \times Dif_{avg_r}}$$

$$C_{sum} = \sum_{r=1}^{9} C_r$$

(6) The ratio ($C_r$) is then divided by the sum ($C_{sum}$) in Step 5 to determine the percentage ($P_r$) of confidence responsible for the summed value, and is now indicative of the likelihood for the ratio of components between Pu-239 and Pu-240 to be derived from, $$P_r = \frac{C_r}{C_{sum}} \quad (10)$$

The above-mentioned algorithm provides for a spectrum of $P_r$ values for any arbitrary mixture of Pu-239 and Pu-240; effectively constituting a figure of merit (FOM) to choose the highest likely (best estimate) value for the ratio of these two isotopes and the associated uncertainty.

Regarding the sample preparation for CTMFD based alpha spectroscopy, a protocol is provided herewith. The study was based on certified Pu-239 and Pu-240 "standards" supplied by U.S. National Institute of Standards and Technology (NIST) and Eckert & Ziegler Isotope Products Technical Service (EZIPTS). Tables 2 and 3 present pertinent data from these two certified isotope standard source suppliers. As noted earlier, conventional alpha spectrometry techniques based on PIPS and LS cannot discern between the (<10 keV separated) alpha emissions from Pu-239 and Pu-240.

TABLE 2

| NIST supplied technical data for Pu-239 sample | |
| --- | --- |
| Pu-239 sample activity | 38.41 Bq g$^{-1}$ (in 2.77 g vial) in 3.7M HNO$_3$ |
| Uncertainty | 0.46% (2 SD) |
| Solution density | 1.108 g mL$^{-1}$ at 23.9° C. |
| Pu-240 activity (as of Nov. 9, 1999) | 0.002 Bq g$^{-1}$ |
| Pu-241 activity (as of Nov. 9, 1999) | 0.02 Bq g$^{-1}$ |
| Am-241 activity (as of Nov. 9, 1999) | 0.001 Bq g$^{-1}$ |

As noted from Table 2, the NIST-supplied source of Pu-239 was almost 100% Pu-239 with very low level of contamination of other alpha emitters. However, we see from Table 3 that the Pu-240 sample comprised ~34.4% activity from Pu-241 with a half-life of ~13 y, and which decays via beta decay to Am-241 (an alpha emitter). Dependent on when the detection is performed, for instance, after a lapse of about 10 y, a significant buildup of Am-241 activity (comprising about 10-15% of alpha activity) must be accounted for. This was indeed taken into account as discussed below.

TABLE 3

| EZIPTS supplied technical data for Pu-240 sample (in 1M HNO$_3$ vials)$^a$ | | | |
| --- | --- | --- | --- |
| Nuclide | Atom (%) | Total activity (%) | α-Activity (%) |
| Pu-238 | 0.00678 | 0.334 | 0.509 |
| Pu-239 | 0.735 | 0.132 | 0.201 |
| Pu-240 | 98.861 | 65.135 | 99.285 |
| Pu-241 | 0.1146 | 34.396 | n/a |
| Pu-242 | 0.283 | 0.00325 | 0.00496 |

$^a$(1) isotopic compositions provided by Oak Ridge National Laboratory, (2) Am-241 = 0.0757% (of Pu-240) on Jun. 3, 2010, (3) Pa-233 = 7.58 × 10$^{-3}$% of Pu-240 on. Jun. 3, 2010, (4) sample activity~7 Bq mL$^{-1}$ in 1M HNO$_3$.

The engineered fluid decafluoropentane (DFP) with the molecular formula $C_5H_2F_{10}$ [rated (0/0/0) for flammability/health/instability on the U.S. National Fire Protection Association (NFPA) standard], and density=1.6 g mL$^{-1}$ was used as the primary working fluid for detection of incident radiation in the CMTFD with a 16 mL sensitive bulb system. Since HNO$_3$ is not soluble in DFP, the as supplied Pu in HNO$_3$ needed to be extracted for transfer into DFP. This required the use of a suitable extraction procedure from the stock nitric acid solution into the CTMFD working fluid which preferentially transferred only the Pu isotopes but not the Am isotopes.

Figure 5:
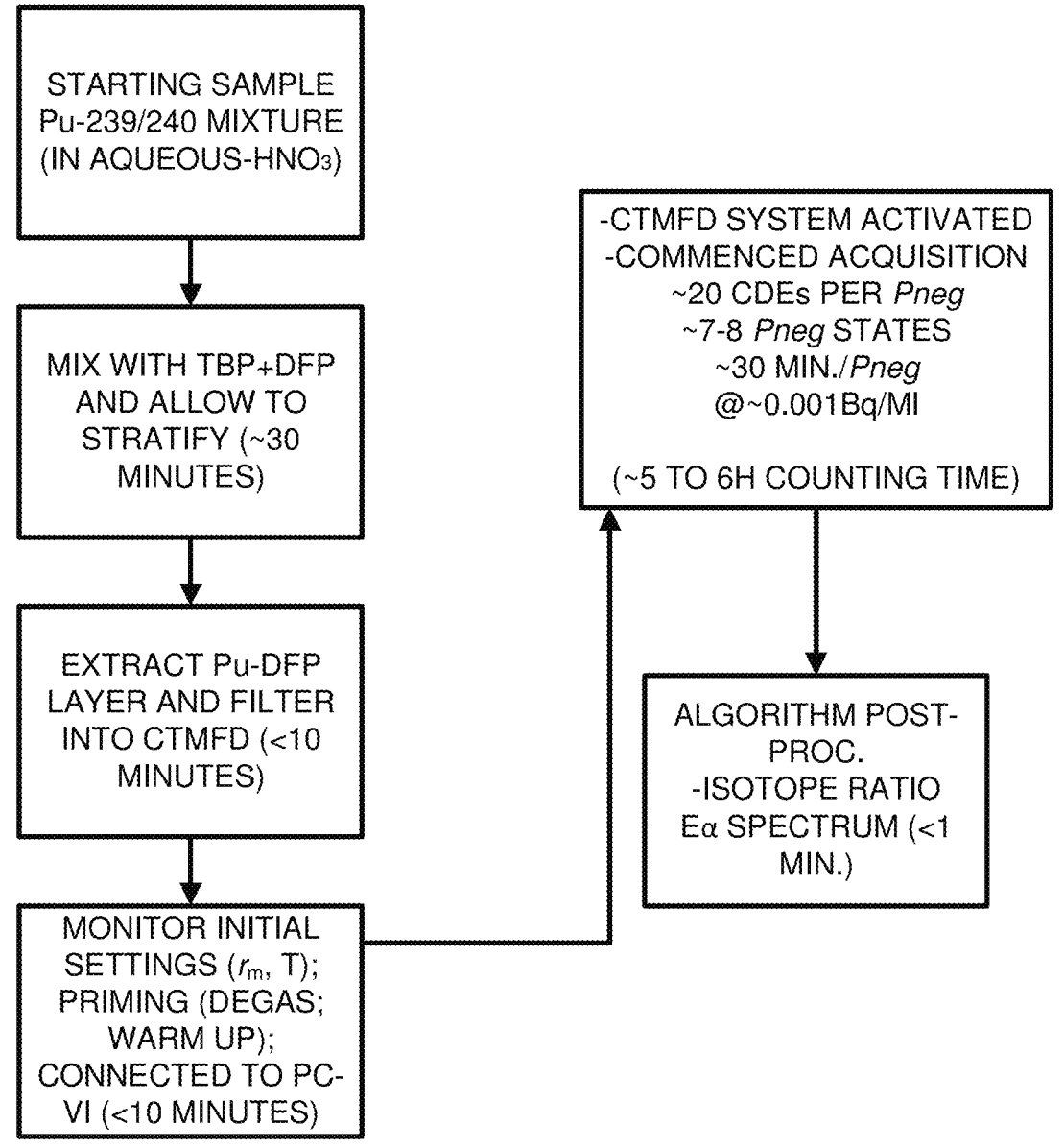
FIG. 5 is a non-limiting schematic diagram illustrating the steps for Pu-239: Pu-240 ratio and alpha spectroscopy with CTMFD, according to one embodiment of the present disclosure.

As shown in FIG. 5, a microliter EPPENDORF® pipette (accurate to <±0.8%) was used to dilute the certified plutonium sample into 6 mL of nitric acid solution. Since nitric acid is not miscible in DFP, tributyl phosphate (TBP) was used to first extract the plutonium from the nitric acid solution into DFP. A mixture was created consisting of 4 mL DFP and 2 mL TBP and then combined with the diluted plutonium bearing stock solution. This mixture was shaken vigorously for thirty seconds and allowed to settle for thirty minutes. It should be appreciated that various periods of time for mixing and settling may be utilized, within the scope of the present disclosure. While the mixture settles, the TBP preferentially extracts the plutonium from the nitric acid after which it is transferred into the DFP and then into the CTMFD, as shown in FIG. 5. The extraction efficiency of TBP for Am isotopes is negligible; <4%. Therefore, the Pu-240 bearing sample could at most comprise <4% of 10% or <0.04% of total alpha activity in the Pu-240 extracted sample. Also, a cross-check was put in place based on considering that the Ex for Am-241 is ~5.5 MeV vs. about 4.25 MeV for Pu-240 and 4.0 MeV for Pu-239. This provides a secondary check for the presence or absence of Am-241 contamination. The higher the value for Ex, the lower is the $P_{neg}$ state required for detection in the CTMFD. If significant Am-241 activity were present, this would very readily manifest itself with detection onset for $P_{neg}$ states well below 4 bar (towards ~3 bar). As shown in FIG. 3, $P_{thresh}$ for the Pu-240 based sample occurs only at/around $P_{neg}$ ~4.25 bar with no detection activity below 4.25 bar. This served as an extra check that the extraction protocol as used predominantly (>99.5%) transfers only the Pu-240 isotope for the CTMFD based studies reported in this paper.

After thirty minutes, the entire mixture was diluted in 94 mL DFP and poured into a titration funnel. Due to density differences, the nitric acid forms a layer at the top while the DFP/TBP (now containing the extracted actinide) settles into the bottom layer. The actinide laden DFP/TBP was then gravimetrically separated and stored in a 125 mL NALGENE® bottle. This process demonstrates excellent, reproducible extraction efficiency for Pu isotopes, and <4% for Am-241.

After extraction, as noted in FIG. 5, the DFP/TBP mixture (now containing the plutonium isotopes) was transferred into the CTMFD glassware through a 0.2 mm PTFE filter (a process that takes about 1 min), evacuated of air, and sealed with a rubber stopper. As to be expected of all fluids, the sensing fluid within the CTMFD contained non-condensable gases (air) which can lead to false CDEs, and must be degassed—an aspect that is readily achieved either via ultrasonic bath submersion or via use of an external neutron source such that about 20+CDEs are sequentially induced when the CTMFD is operated at up to $P_{neg}$~5 bar. Each CDE leads to progressive release of dissolved gases. A protocol was developed using a 10 mCi Am—Be isotope neutron source (emitting ~2×10^4 n s^{-1}) about 1 m away from the CTMFD, which leads to CDEs within 1-10 s for each cavitation event. The accumulated air within the CTMFD's cavity space in the upper arms is then removed via syringe and the CTMFD is now sealed and ready for alpha spectroscopy within ~10 min from start.

Figure 6:
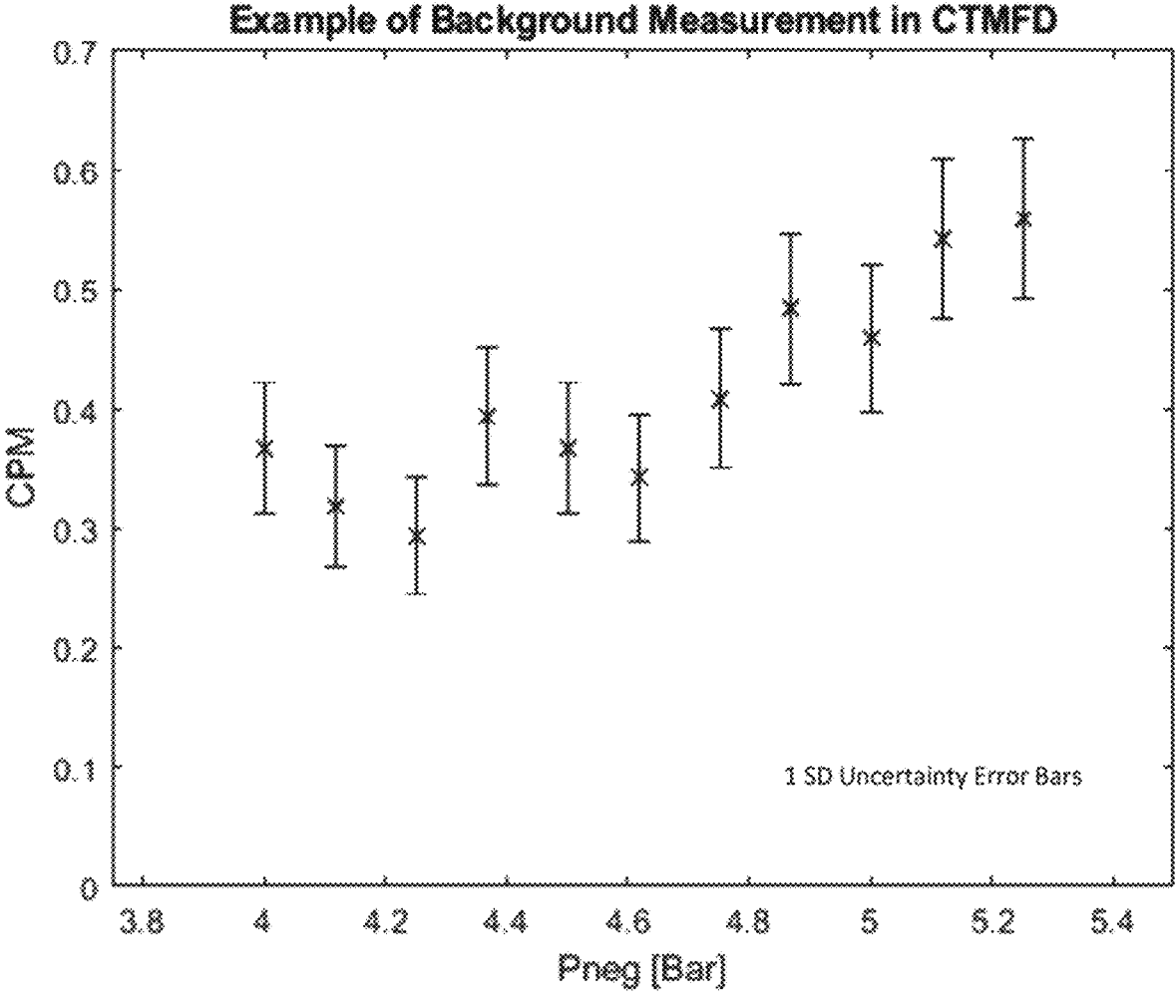
FIG. 6 is a plot diagram illustrating background variation of count rate compared to negative pressure using 15 cc CTMFD, according to one embodiment of the present disclosure.
Figure 7:
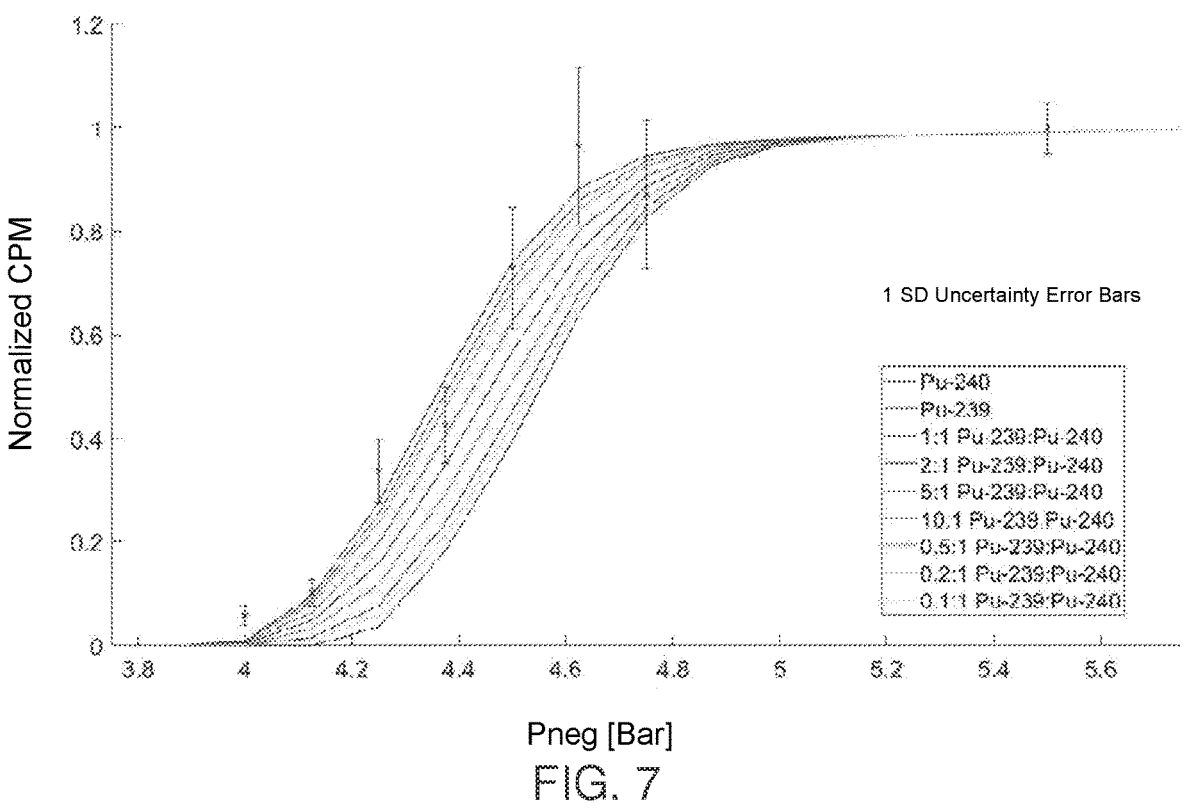
FIG. 7 is a plot diagram illustrating a response curve demonstrating the variation of normalized count rate compared to negative pressure for Pu-239: Pu-240=1:0 activity ratio mixture, according to one embodiment of the present disclosure.
Figure 8:
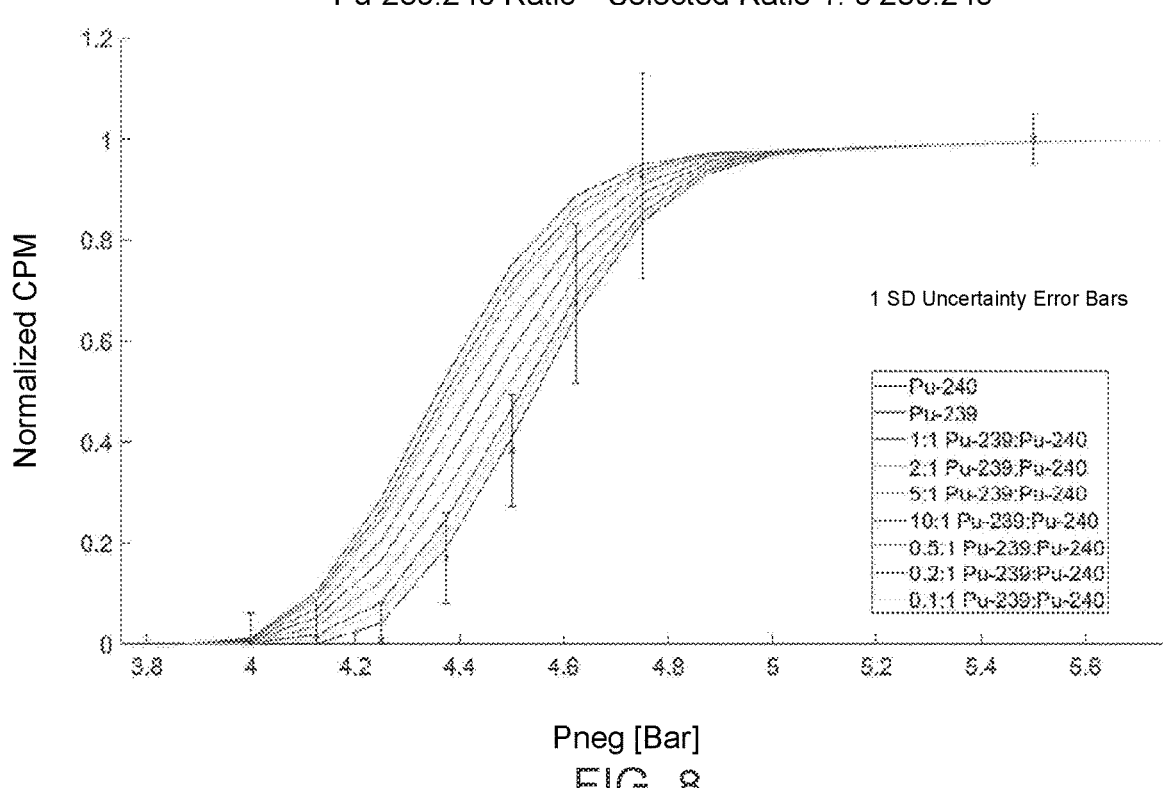
FIG. 8 is a plot diagram illustrating a response curve demonstrating the variation of normalized count rate compared to negative pressure for Pu-239: Pu-240=0:1 activity ratio mixture, according to one embodiment of the present disclosure.
Figure 9:
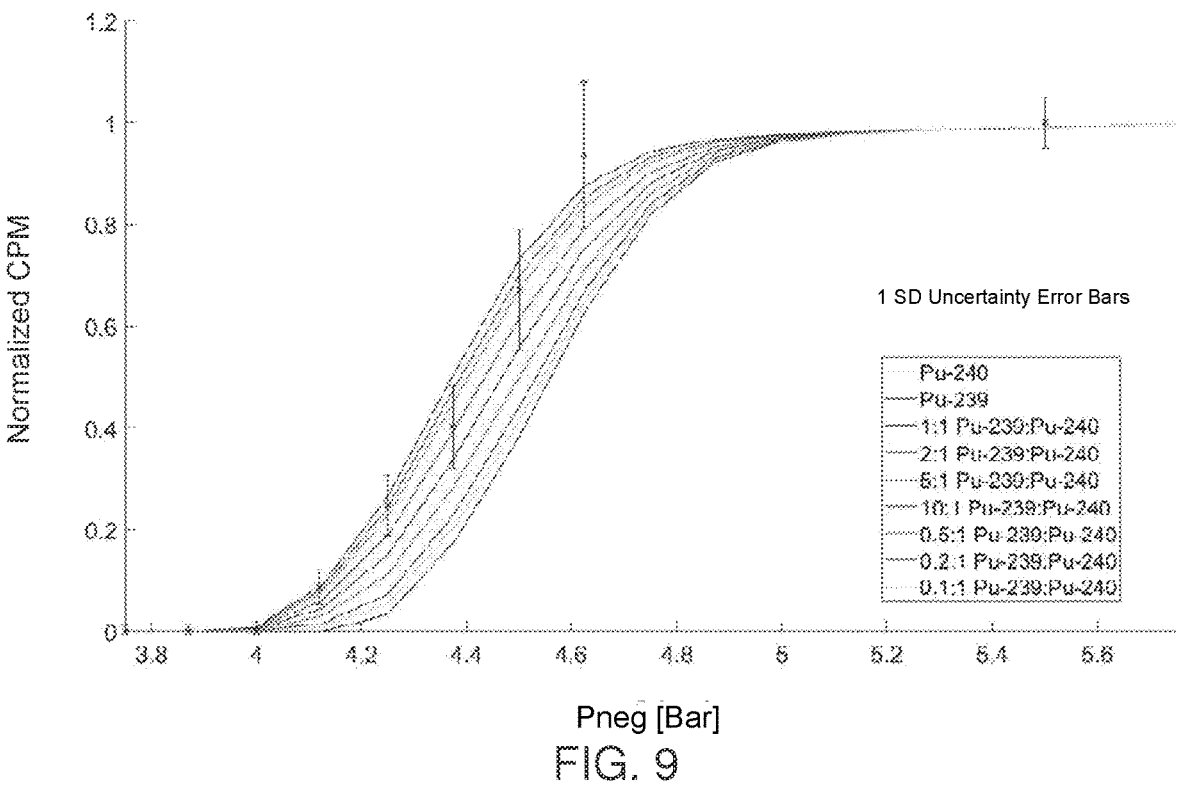
FIG. 9 is a plot diagram illustrating a response curve demonstrating the variation of normalized count rate compared to negative pressure for Pu-239: Pu-240=5:1 activity ratio mixture, according to one embodiment of the present disclosure.
Figure 10:
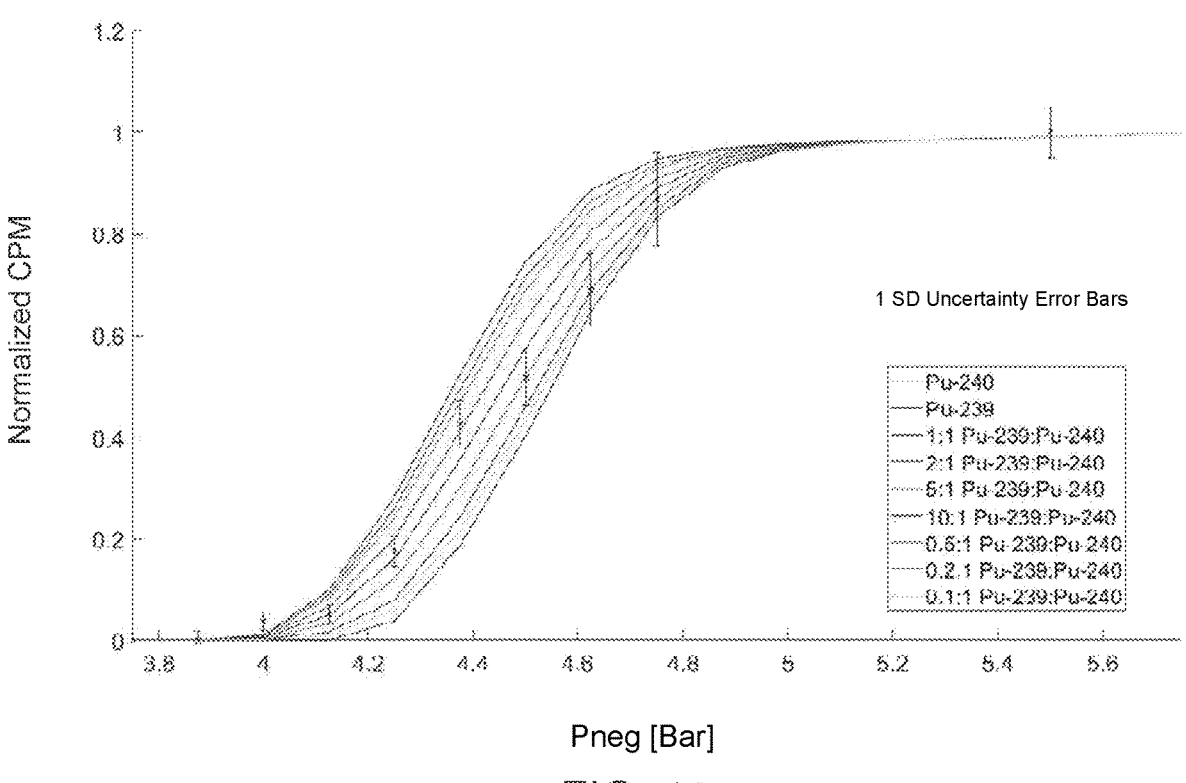
FIG. 10 is a plot diagram illustrating a response curve demonstrating the variation of normalized count rate compared to negative pressure for Pu-239: Pu-240=1:1 activity ratio mixture, according to one embodiment of the present disclosure.
Figure 11:
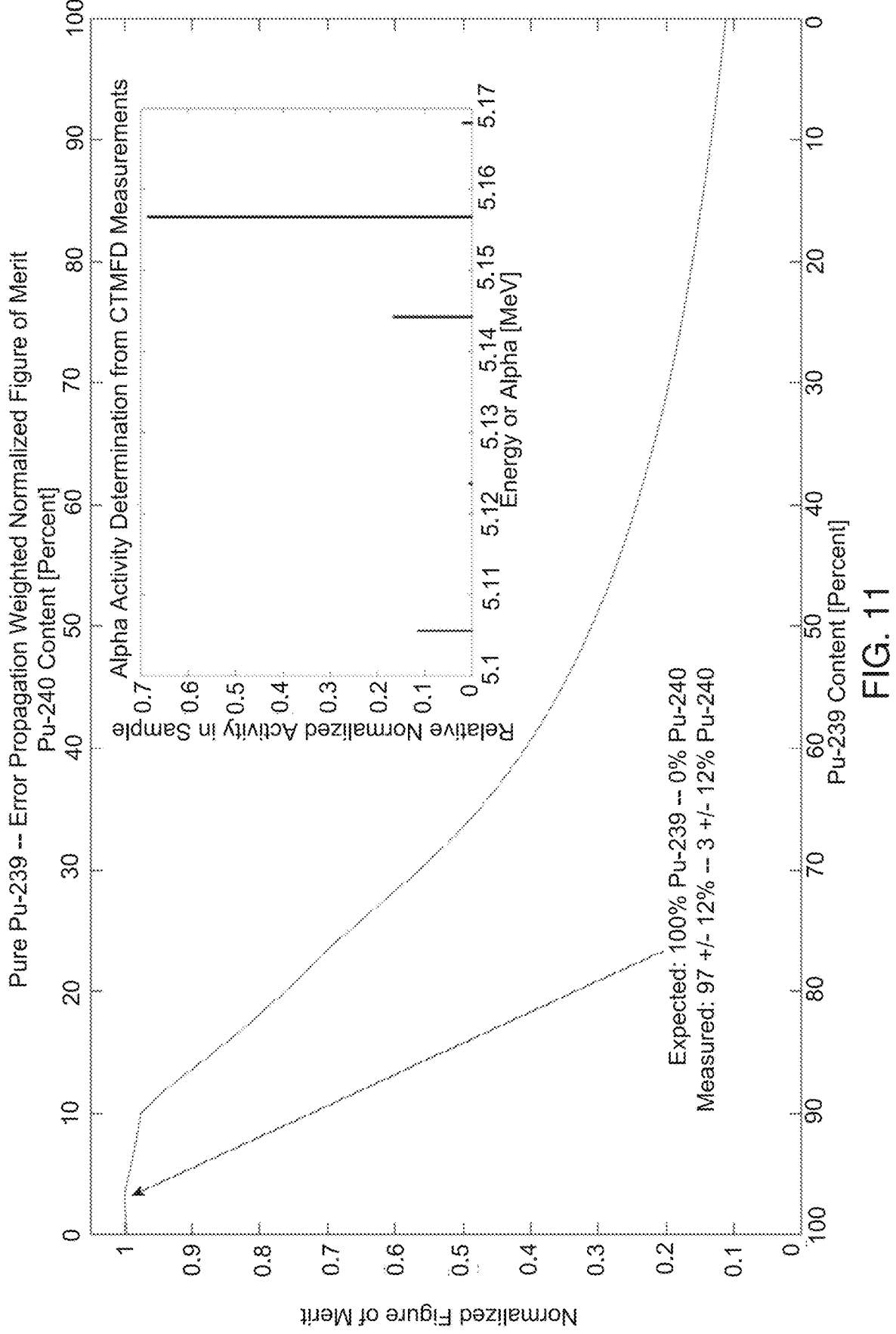
FIG. 11 is a line graph illustrating an error propagation weighted normalized figure of merit, further depicting the variation of pure Pu-239 and a predicted alpha energy spectrum, according to one embodiment of the present disclosure.
Figure 12:
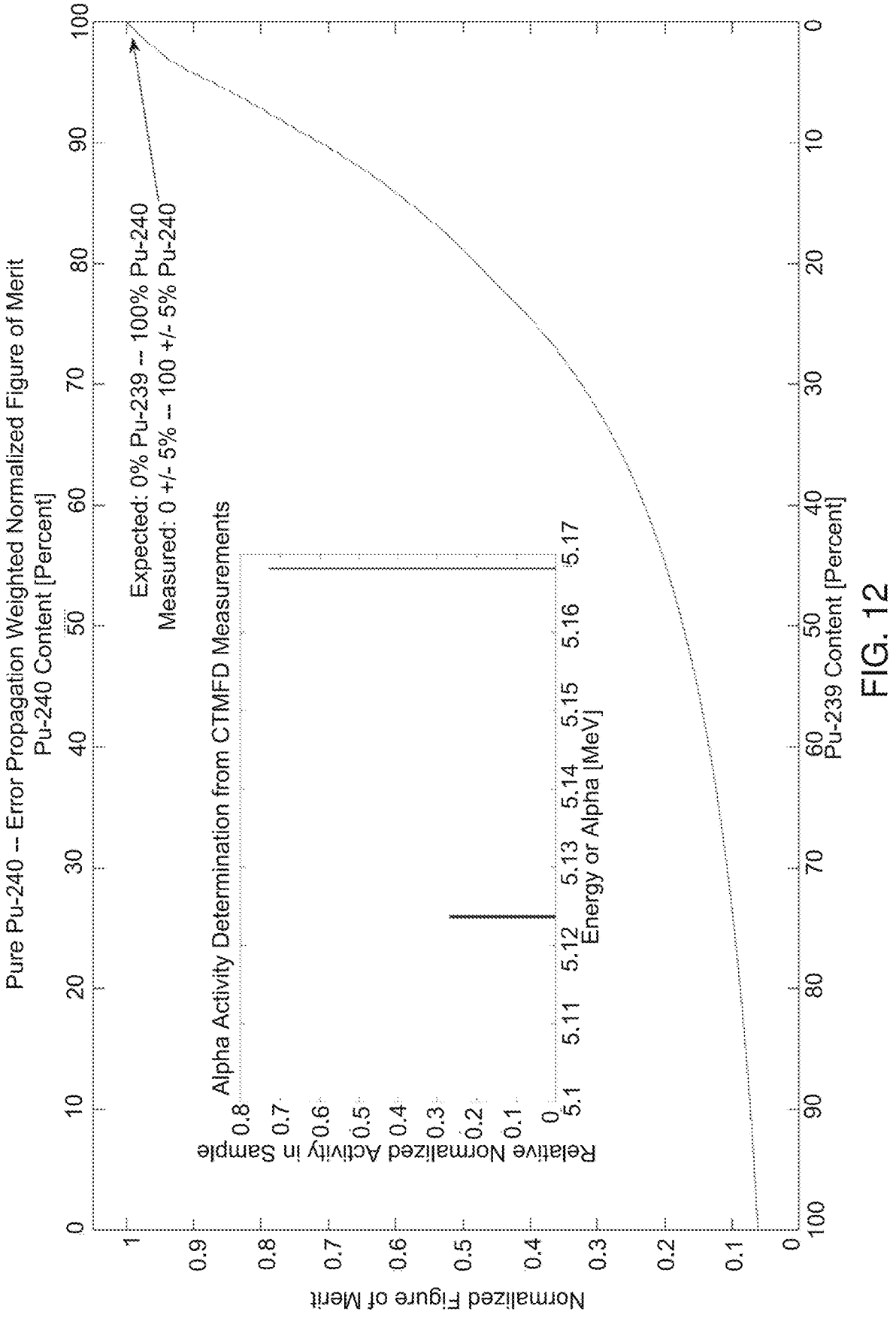
FIG. 12 is a line graph illustrating an error propagation weighted normalized figure of merit, further depicting the variation of pure Pu-240 and a predicted alpha energy spectrum, according to one embodiment of the present disclosure.
Figure 13:
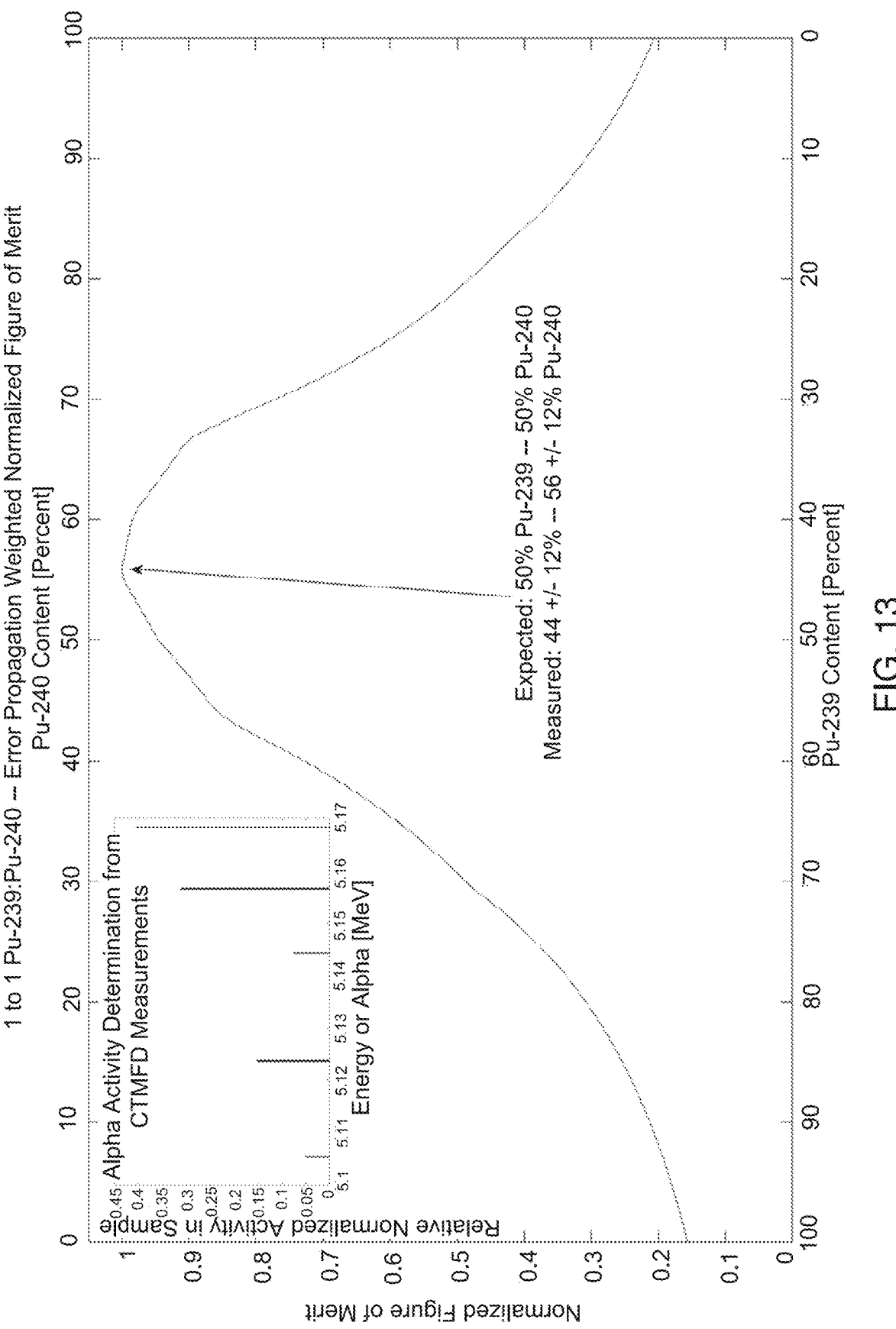
FIG. 13 is a line graph illustrating an error propagation weighted normalized figure of merit, further depicting the variation for Pu-239: Pu-240=1:1 activity ratio mixture and a predicted alpha energy spectrum, according to one embodiment of the present disclosure.
Figure 14:
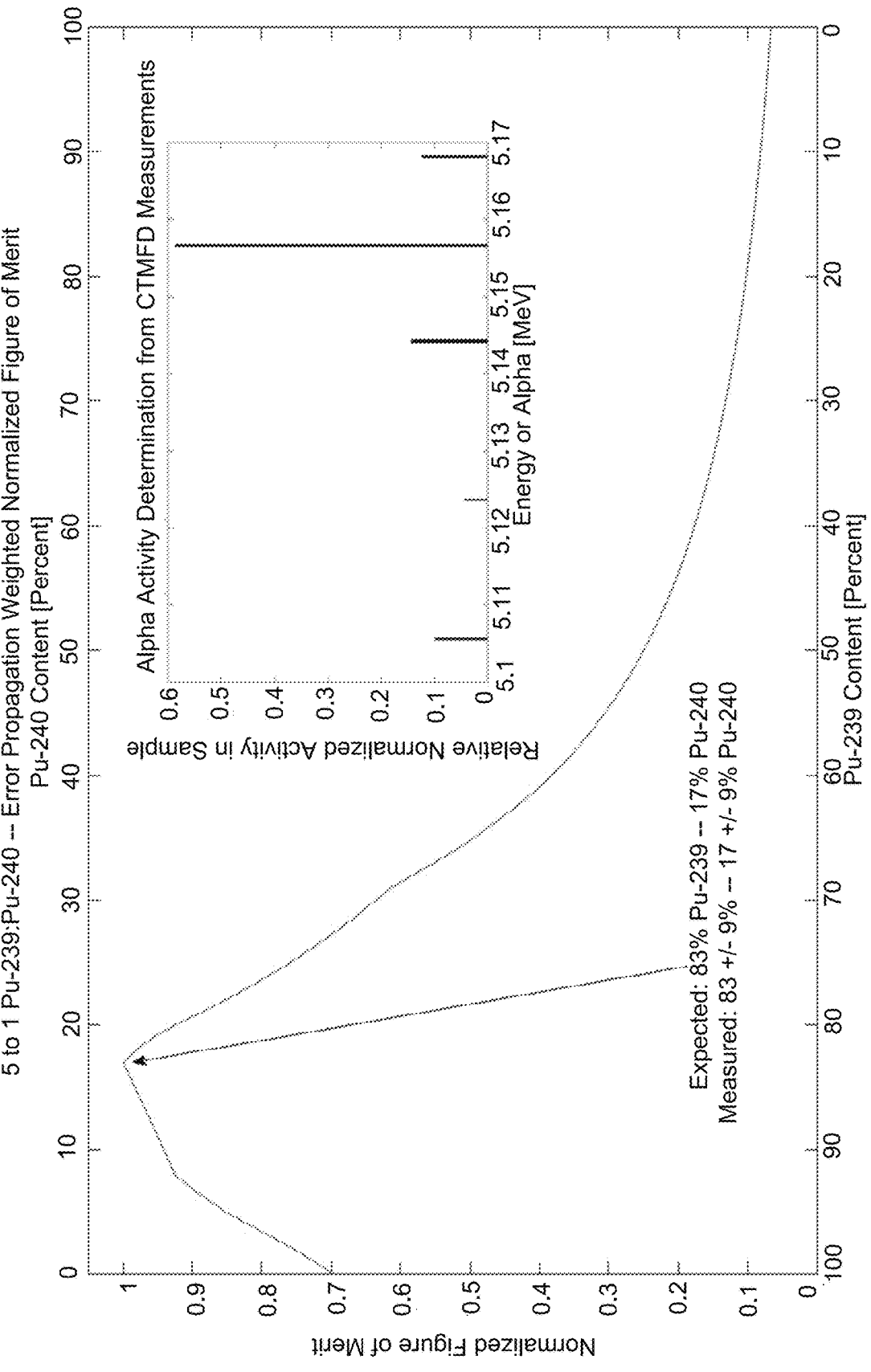
FIG. 14 is a line graph illustrating an error propagation weighted normalized figure of merit, further depicting the variation for Pu-239: Pu-240=5:1 activity ratio mixture and a predicted alpha energy spectrum, according to one embodiment of the present disclosure.

CDEs in a degassed CTMFD may also occur due to external neutron background and must be ascertained for subtraction/correction. Without any intentionally entered alpha bearing isotope within the 16 mL CTMFD filled with vendor-supplied filtered DFP, a neutron background (from cosmic and other isotope neutron sources in storage cabinets) led to a background count rate ranging from ~0.33 cpm at $P_{neg}$~4 bar, towards ~0.55 cpm at $P_{neg}$ ~5.5 bar. FIG. 6 shows such a typical background detection rate vs. $P_{neg}$ state variation. The background CDE rate (in a degassed system) is first estimated with the CTMFD filled with only DFP fluid (i.e., without alpha emitters). Thereafter, the same CTMFD is refilled with DFP containing various extracted ratios of Pu isotopes and the aggregated cpm values are corrected for each of the $P_{neg}$ states for conducting alpha spectrometry. It is expressly assumed (and reasonable care was taken) that the neutron background (including cosmic neutrons) in the experiment room remained unchanged during the course of alpha detection experiments. This was verified at start and end of data acquisition for each campaign.

As an extra note, to ensure consistent operation (within ±10% of the calibration curve), prior to start of data acquisition, the specific CTMFD unit's detection efficiency vs. $P_{neg}$ is compared to its calibration curve generated for that unit with an Am—Be source, right after fabrication and readiness for use.

Experiments and analyses were conducted with Pu-239: Pu-240 activity ratios varying between, 1:1, 0:1, 5:1, and 1:1, as shown in FIGS. 7-14. For each response curve, the raw cpm data are background corrected and then normalized to the detection rate after reaching the plateau region. For example, the background subtracted cpm values are normalized by 1.4 cpm in the example shown in FIG. 3 for a Pu-239: Pu-240 ratio of 0:1. Note: this example case illustrates results obtained with only ~0.02 Bq total Pu-240 activity in the 16 mL sensitive volume CTMFD.

For the results presented in FIGS. 7-14, data were obtained with ~0.1 Bq total activity in the sensitive volumes. Error bars represent 1 SD uncertainty.

FIGS. 7-10 present the normalized cpm vs. $P_{neg}$ data response curves for the four Pu-239: Pu-240 activity ratios, ranging from 1:0 to 0:1. Cavitation detection events in the CTMFD system are monitored and timed using infrared sensors, $P_{neg}$ states are dynamically controlled with temperature compensation, and CDEs are recorded using LabVIEW virtual instruments software. FIGS. 7-10 illustrate the detector response overlaid with the best-fit model (predicted) curves. As expected, the background subtracted response of the CTMFD is initially zero below the negative pressure threshold, $P_{thresh}$, for the specific actinide (e.g., ~4.0 bar for Pu-239). When the detector approaches the threshold, the actinide decay at the centerline of the bulb is now able to be detected. As the $P_{neg}$,cl increases, the $P_{neg,thresh}$ pressure state expands radially away from the centerline and progressively causes actinides located to that radius to also participate in the detection process until the entire bulb is ≥$P_{neg}$,thresh. Despite the occasional departure between the 1-D model prediction vs. actual data, the response spectra correlate reasonably well overall.

The response curve data for figure of merit versus the model predictions were analyzed using the deconvolution algorithm and the results are depicted graphically in FIGS. 11-14 for the value of the error propagated normalized probability, $P_r$ (%), versus possible Pu-239 content in a Pu-239/Pu-240 mixture. Results are also summarized in Table 4. FIGS. 11-14 also include the predicted spectroscopy data for alpha activity vs. energy for each of the four mixture configurations.

TABLE 4

Summary of expected vs. measurement-based predictions for 4 test cases
(Pu-239:Pu-240 activity content in mixtures)

| Case# (Pu-239:Pu-240 ratio) | Expected (NIST-std based)[a] %, Pu-239:Pu-240 | Predicted—most likely[b] % (±), Pu-239:Pu-240 |
|---|---|---|
| 1 (1:0) | 100:0 | 97:3 (±12) |
| 2 (0:1) | 0:100 | 0:100 (±5) |
| 3 (1:1) | 50:50 | 44:56 (±12) |
| 4 (5:1) | 83:17 | 83:17 (±9) |

[a]~1.5% est. total sample activity uncertainty = ~0.5% (NIST std) + ~1% (pipetting-transfer).
[b]Algorithm based highest probability FOM—see FIG. 11-14.

As noted from Table 4, the correct Pu-239: Pu-240 activity ratio is accurately predicted for all the experiments by a good level of confidence; thereby, indicating the overall uncertainty of the prediction to be within ~±12% of the activity ratio, based on the cases considered.

Advantageously, the system and method of the present disclosure may enable spectroscopically detecting trace ($<10^{-3}$ Bq mL$^{-1}$) level alpha emitting radionuclides with under 10 keV alpha energy resolution. The present disclosure may be utilized and assessed for the ability to decipher trace level Pu-239 and Pu-240 content in mixtures of these two isotopes ranging in alpha activity content from 1:0 to 0:1 in relative proportions.

Desirably, the method includes a rapid (<1 h) extraction-transfer protocol to create DFP sensing fluid mixture quantities of these isotopes for CTMFD based examination and to derive the mixture's characteristic response function, viz., alpha decay detection rate over a range of tensioned meta-stable state negative pressure ($P_{neg}$) states ranging from 4.0 bar for Pu-239, to about 4.25 bar for Pu-240. The accompanying methodology and error propagation algorithm may further analyze-deconvolute the mixture's response curve comprising the Pu alpha emitting isotopes, and to derive the likely composition of each isotope within the mixture. For each of the four Pu-239: Pu-240 activity ratios: 1: 0, 5:1, 1:1 and 0:1, the algorithm correctly predicted the most likely ratio compositions for the two Pu isotopes. Overall, the non-limiting results from the experiments revealed the system and method to be capable of enabling Pu-239: Pu-240 mixture spectroscopy with an estimated uncertainty of ±5% to ±12%; that is, via enabling the accurate (~90%) classification of each mixture composition tested in all experiments, which then translates into prediction of the spectroscopic alpha energy emission activity for the mixture.

Furthermore, the system and method enables such identification of the Pu-239: Pu-240 ratios from 1:0 to 0:1 with uncertainty ranging from 5% to 12%, within ~3-4 h of counting for any arbitrary ratio, inclusive of sample preparation and data acquisition from a single precalibrated CTMFD. It should be appreciated that the 5:1 activity ratio case actually translates into a mass ratio of ~20:1 due to the ~4× higher half-life for Pu-239 (~24 390 y) vs. Pu-240 (6580 y). This enablement may be suitable for nuclear forensic applications such as for identifying the source/origin of the Pu-based SNM, as well as for environmental samples.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A system configured to determine an isotopic ratio of an isotope bearing sample, comprising:
   a tensioned metastable fluid detector apparatus;
   a mixing chamber; and
   a processor communicatively coupled to the tensioned metastable fluid detector apparatus, the processor executing steps to form an isotope detection rate versus negative pressure response curve and to determine the isotopic ratio.

2. The system of claim 1, wherein the prediction an isotope detection rate versus negative pressure response curve includes identifying a negative pressure of a center line in the tensioned metastable fluid detector apparatus.

3. The system of claim 1, wherein the prediction of an isotope detection rate versus negative pressure response curve includes identifying a radius of a portion of fluid that is above a threshold negative pressure state.

4. The system of claim 1, wherein the prediction of an isotope detection rate versus negative pressure response curve includes identifying a predicted count rate at a negative pressure state.

5. The system of claim 1, wherein the determination of the isotopic ratio includes determining a difference between a measured count rate and an expected count rate for each isotopic ratio at a measured negative pressure.

6. The system of claim 5, further comprising the determination of a measurement error.

7. The system of claim 6, further comprising the determination of a percentage of confidence between the isotopic ratio and the measurement of error.

8. The system of claim 1, wherein the tensioned metastable fluid detector apparatus is a centrifugally tensioned metastable fluid detector apparatus.

9. The system of claim 8, wherein the centrifugally tensioned metastable fluid detector apparatus is molded with a plastic material.

10. The system of claim 9, wherein the plastic material does not chemically react with a centrifugally tensioned metastable fluid detector sensing fluid.

11. The system of claim 9, wherein the centrifugally tensioned metastable fluid detector apparatus includes a main housing that is substantially diamond-shaped, the main housing has a first portion and a second portion, the first portion is coupled to the second portion by at least one of an adhesive, a thermal means, and an acoustic means.

12. The system of claim 1, wherein the system has an alpha energy resolution under 10 keV.

13. The system of claim 1, wherein the system has a 4x alpha detection efficiency greater than about ninety-five percent.

14. A nuclear forensic detector using the system of claim 1.

* * * * *